US012768023B2

(12) United States Patent
Matsui et al.

(10) Patent No.: US 12,768,023 B2
(45) Date of Patent: Oct. 20, 2026

(54) STEEL SHEET, MEMBER, AND METHODS FOR MANUFACTURING SAME

(71) Applicant: JFE Steel Corporation, Tokyo (JP)

(72) Inventors: Yoichiro Matsui, Tokyo (JP); Tadachika Chiba, Tokyo (JP); Shinjiro Kaneko, Tokyo (JP); Akinori Nakamura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 18/683,839

(22) PCT Filed: Aug. 15, 2022

(86) PCT No.: PCT/JP2022/030898
§ 371 (c)(1),
(2) Date: Feb. 15, 2024

(87) PCT Pub. No.: WO2023/032651
PCT Pub. Date: Mar. 9, 2023

(65) Prior Publication Data
US 2025/0122602 A1 Apr. 17, 2025

(30) Foreign Application Priority Data
Aug. 31, 2021 (JP) ................................ 2021-141114

(51) Int. Cl.

| | |
|---|---|
| ***C21D 9/46*** | (2006.01) |
| ***B32B 15/01*** | (2006.01) |
| ***C21D 1/26*** | (2006.01) |
| ***C21D 6/00*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/14*** | (2006.01) |
| ***C22C 38/42*** | (2006.01) |
| ***C22C 38/44*** | (2006.01) |
| ***C22C 38/50*** | (2006.01) |
| ***C22C 38/54*** | (2006.01) |
| ***C22C 38/58*** | (2006.01) |
| ***C22C 38/60*** | (2006.01) |

(52) U.S. Cl.
CPC ............ *C22C 38/60* (2013.01); *B32B 15/013* (2013.01); *C21D 1/26* (2013.01); *C21D 6/005* (2013.01); *C21D 6/008* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/42* (2013.01); *C22C 38/44* (2013.01); *C22C 38/50* (2013.01); *C22C 38/54* (2013.01); *C22C 38/58* (2013.01); *B32B 2311/20* (2013.01); *C21D 2211/001* (2013.01); *C21D 2211/005* (2013.01); *C21D 2211/008* (2013.01)

(58) Field of Classification Search
CPC ........................................................ C21D 9/46
See application file for complete search history.

(56) References Cited

U.S. PATENT DOCUMENTS

| | | | | |
|---|---|---|---|---|
| 2015/0203947 | A1 | 7/2015 | Hasegawa et al. | |
| 2016/0208359 | A1 | 7/2016 | Kasuya et al. | |
| 2019/0040483 | A1 | 2/2019 | Kimata et al. | |
| 2019/0330721 | A1 | 10/2019 | Hayashi et al. | |
| 2019/0352750 | A1 | 11/2019 | Hebesberger et al. | |
| 2021/0010115 | A1 * | 1/2021 | Yoshitomi ................ | C21D 1/20 |
| 2022/0074013 | A1 | 3/2022 | Hasegawa et al. | |
| 2024/0384379 | A1 | 11/2024 | Chiba et al. | |
| JP 385B206 | | 12/2006 | | |
| JP 441B221 | | 2/2010 | | |

FOREIGN PATENT DOCUMENTS

| | | | |
|---|---|---|---|
| CN | 111936651 | A | 11/2020 |
| EP | 3 757 243 | A1 | 12/2020 |
| JP | H0635619 | B2 | 5/1994 |

(Continued)

OTHER PUBLICATIONS

International Search Report (PCT/ISA/210) with translation and Written Opinion (PCT/ISA/237) mailed Nov. 1, 2022, by the Japan Patent Office as the International Searching Authority for International Application No. PCT/JP2022/030898. (8 pages).
Office Action issued by the U.S. Patent and Trademark Office in the U.S. Appl. No. 18/683,857, mailed Jul. 29, 2025, U.S. Patent and Trademark Office, Alexandria, VA. (13 pages).
Extended European Search Report issued Sep. 10, 2024, by the European Patent Office in corresponding European Patent Application No. 22864236.9-1103. (8 pages).
Tang et al., "Effect of Bainite Isothermal Time on Microstructure and Mechanical Properties of Ultra-high Strength Cold-rolled Transformation Induced Plasticity Steel" Iron Steel Vanadium Titanium, (Dec. 2016), vol. 37, No. 6, pp. 133-136 and an English translation. (9 pages).

(Continued)

*Primary Examiner* — Jophy S. Koshy
(74) *Attorney, Agent, or Firm* — Buchanan Ingersoll & Rooney PC

(57) ABSTRACT

Provided are a steel sheet; a related member; and methods for manufacturing the same. The steel sheet has a chemical composition including, in mass %, C: 0.06 to 0.25%, Si: 0.4 to 2.5%, Mn: 1.5 to 3.5%, P: 0.02% or less, S: 0.01% or less, sol. Al: less than 1.0%, and N: less than 0.015%, the balance being Fe and incidental impurities, the steel sheet being such that the steel sheet includes a steel microstructure including, in area fraction, polygonal ferrite: 10% or less (including 0%), tempered martensite: 40% or more, fresh martensite: 20% or less (including 0%), bainitic ferrite having 20 or less internal carbides per 10 $\mu m^2$: 3 to 40%, and, in volume fraction, retained austenite: 5 to 20%, and the steel sheet has $S_{C\geq 0.5}/S_{C\geq 0.3}\times 100$ of 20% or more.

6 Claims, 2 Drawing Sheets

(56) References Cited

FOREIGN PATENT DOCUMENTS

| | | | | | |
|---|---|---|---|---|---|
| JP | 5463685 | B2 | | 4/2014 | |
| JP | 5728115 | B1 | | 4/2015 | |
| JP | 5780086 | B2 | | 7/2015 | |
| JP | 2016-008310 | A | | 1/2016 | |
| JP | 2016180139 | A | | 10/2016 | |
| JP | 2020509162 | A | | 3/2020 | |
| JP | 2020100894 | A | | 7/2020 | |
| JP | 2020164990 | A | | 10/2020 | |
| WO | 2017138504 | A1 | | 8/2017 | |
| WO | 2017208759 | A1 | | 12/2017 | |
| WO | WO-2019189842 | A1 | * | 10/2019 | ............... C23C 2/40 |
| WO | 2020136988 | A1 | | 7/2020 | |

OTHER PUBLICATIONS

Office Action (The First Office Action) issued Mar. 31, 2026, by the State Intellectual Property Office of People's Republic of China in corresponding Chinese Patent Application No. 202280056863.3 and an English translation with Concise explanation of relevance of the Office Action. (19 pages).

Office Action issued by the U.S. Patent and Trademark Office in the U.S. Appl. No. 18/683,857, mailed Oct. 31, 2025, U.S. Patent and Trademark Office, Alexandria, VA. (12 pages).

Office Action issued by the U.S. Patent and Trademark Office in the U.S. Appl. No. 18/683,857, mailed Mar. 26, 2026, U.S. Patent and Trademark Office, Alexandria, VA. (12 pages).

* cited by examiner (A)

ASPECT RATIO: a/b (B)

WHEN PARTICLES ARE IN CONTACT WITH ONE ANOTHER, DIVIDE PARTICLES ALONG BROKEN LINE THAT DIVIDES PARTICLES APPROXIMATELY EVENLY AND MEASURE SIZES OF RESPECTIVE PARTICLES

STEEL SHEET, MEMBER, AND METHODS FOR MANUFACTURING SAME

CROSS REFERENCE TO RELATED APPLICATIONS

This is the U.S. National Phase application of PCT/JP2022/030898, filed Aug. 15, 2022, which claims priority to Japanese Patent Application No. 2021-141114, filed Aug. 31, 2021, the disclosures of these applications being incorporated herein by reference in their entireties for all purposes.

FIELD OF THE INVENTION

The present invention relates to a steel sheet for use in various applications including automobiles and home appliances, to a member using the steel sheet, and to methods for manufacturing the same.

BACKGROUND OF THE INVENTION

In response to the recent growth in the need for lightweight automobile bodies, 980-1180 MPa grade high strength steel sheets are increasingly applied to automobile frame parts and seat parts. However, the application of 980-1180 MPa grade high strength steel sheets to automotive parts tends to result in press cracking due to low ductility and low stretch flange formability. Thus, these high strength steel sheets are required to be improved in formability compared to the conventional level. Furthermore, weight reduction and increased rigidity of parts are being sought through utilization of laser welding. For example, efforts are being made on: the utilization of tailor welded blanks in which steel sheets with different thicknesses or strengths are joined together to give a blank material before pressing; laser welding of edges or flanges of pressed parts into closed cross-section structures; downsizing of flanges; and enhancements in weld strength compared to conventional spot welding.

When 590-1470 MPa grade high strength steel sheets are applied to automotive parts, press cracking is likely to occur due to low ductility. The microstructure of these steel sheets includes hard martensite in many cases in order to enhance strength and ductility. Due to this fact, laser welding of these steel sheets results in significant softening by the softening of martensite in heat-affected zones (hereinafter, also written as HAZ). As a result, problems arise such as a HAZ softened portion is fractured during press forming or a HAZ softened portion is fractured preferentially during deformation of the part, lowering the strength of the part. Thus, these high strength steel sheets are desired to be excellent in conventional formability and to have small HAZ softening.

From the above background, techniques for enhancing the ductility of steel sheets have led to the development of TRIP steel in which retained austenite (retained γ) is dispersed in the microstructure of the steel sheets.

For example, Patent Literature 1 discloses that a high-ductility steel sheet having a TS (tensile strength) of 80 $kgf/mm^2$ or more and TS×El≥2500 $kgf/mm^2$·% is obtained by annealing a steel that contains C: 0.10 to 0.45%, Si: 0.5 to 1.8%, and Mn: 0.5 to 3.0%, and aging the steel at 350 to 500° C. for 1 to 30 minutes to form retained γ.

Patent Literature 2 discloses that a steel sheet excellent in ductility (El) and stretch flange formability (λ) is obtained by annealing a steel that contains C: 0.10 to 0.25%, Si: 1.0 to 2.0%, and Mn: 1.5 to 3.0%, cooling the steel to 450 to 300° C. at 10° C./s or more, and holding the steel for 180 to 600 seconds, thereby controlling the space factor of retained austenite to 5% or more, the space factor of bainitic ferrite to 60% or more, and the space factor of polygonal ferrite to 20% or less.

Patent Literature 3 discloses that a steel sheet having a specific chemical composition is annealed, cooled to a range of temperatures of 150 to 350° C., and subsequently reheated to and held at 350 to 600° C. According to the disclosure, the microstructure obtained as described above includes ferrite, tempered martensite, and retained austenite, and high ductility and high stretch flange formability can be imparted to the steel sheet. This technique utilizes the so-called Q & P (quenching & partitioning) principle (quenching and partitioning of carbon from martensite to austenite) in which the steel in the cooling process is cooled once to a range of temperatures between the martensite start temperature (Ms temperature) and the martensite finish temperature (Mf temperature), and is subsequently reheated and held to stabilize retained γ. In recent years, this principle is applied to the development of high strength steels with high ductility and high stretch flange formability.

Patent Literature 4 discloses a technique that improves the Q & P process described above. Specifically, this technique achieves high ductility and high stretch flange formability by annealing a steel with a specific chemical composition at a temperature equal to or higher than $Ae_3$ temperature−10° C. to ensure that polygonal ferrite will be 5% or less, and cooling the steel to a relatively high finish cooling temperature of Ms−10° C. to Ms−100° C. to ensure that upper bainite will be formed when the steel is reheated to 350 to 450° C.

Furthermore, Patent Literature 5 discloses a technique that utilizes low-temperature bainite and high-temperature bainite to obtain a steel sheet with excellent ductility and low-temperature toughness. Specifically, a steel that contains C: 0.10 to 0.5% is annealed, cooled to 150 to 400° C. at a cooling rate of 10° C./s or more, held at the above temperature for 10 to 200 seconds to form low-temperature bainite, then reheated to a range of temperatures of more than 400° C. and 540° C. or below, and held for 50 seconds or more to form high-temperature bainite. A steel sheet with excellent ductility and low-temperature toughness is thus obtained.

Furthermore, Patent Literature 6 discloses that a steel sheet having excellent ductility, flangeability, and weldability is obtained by annealing a steel sheet that contains C: 0.01 to 0.3%, Si: 0.005 to 2.5%, Mn: 0.01 to 3%, Mo: 0.01 to 0.3%, and Nb: 0.001 to 0.1% in a high-temperature region where the microstructure is almost a γ single phase, cooling the steel sheet to a temperature range of 200 to 450° C., and holding the steel sheet at the temperature to ensure that the microstructure contains 50 to 97% bainite or bainitic ferrite as the main phase and 3 to 50% austenite as the second phase.

PATENT LITERATURE

PTL 1: Japanese Examined Patent Application Publication No. 6-35619
PTL 2: Japanese Patent No. 4411221
PTL 3: Japanese Patent No. 5463685
PTL 4: Japanese Patent No. 5780086
PTL 5: Japanese Patent No. 5728115
PTL 6: Japanese Patent No. 3854506

SUMMARY OF THE INVENTION

The conventional TRIP steel described in Patent Literature 1 has excellent ductility, but its stretch flange formability is very low.

In the technique described in Patent Literature 2, the microstructure is mainly bainitic ferrite and includes a small amount of ferrite. Because of this configuration, the steel sheet is excellent in stretch flange formability but is not necessarily high in ductility. Thus, further improvements in ductility are desired for application to parts that are difficult to form.

The technique described in Patent Literature 3 realizes relatively high ductility and high stretch flange formability compared to the conventional TRIP steels and steels making use of bainitic ferrite. However, fracture occurs in the formation of hard-to-form parts, such as center pillars, and further enhancements in ductility are desired. It has become clear that a steel sheet according to this technique does not necessarily have a sufficient amount of uniform deformation that indicates the degree of resistance to fracture. The amount of uniform deformation is a ductility indicator El that indicates the amount of elongation to the onset of necking and is written as U. El. A further increase in U. El is desired.

The technique described in Patent Literature 4 cannot ensure sufficient ductility because the polygonal ferrite formation is lessened in order to reduce the amount of massive martensite. Furthermore, because the finish cooling temperature is set relatively high in order to enhance El, a large amount of non-transformed γ remains at the termination of cooling and consequently massive martensite tends to remain.

The technique described in Patent Literature 5 makes use of low-temperature bainite and high-temperature bainite in order to enhance ductility. Bainite that transforms at low temperatures has only a small contribution to ductility enhancement, and the use of high-temperature bainite tends to be accompanied by massive microstructures that remain. It is therefore difficult to impart high ductility and high stretch flange formability at the same time.

The technique described in Patent Literature 6 offers improvements of materials having higher strength. While the technique is effective when the laser welding speed is fast and the heat input is small, significant HAZ softening occurs under normal-speed or low-speed welding conditions where the laser output is 4 to 6 kW and the welding speed is 3 to 5 mpm. Specifically, the joint is fractured at HAZ when subjected to a tensile test along the tensile axis perpendicular to the laser weld line. Furthermore, the ductility is not necessarily high, and further enhancements in ductility are desired.

As described above, the conventional techniques have been unsuccessful in producing steel sheets that ensure sufficiently high ductility and high stretch flange formability.

Aspects of the present invention have been made to solve the problems discussed above and include a steel sheet that has 980 MPa or higher tensile strength, has high ductility and excellent stretch flange formability, and further has excellent laser weldability; a related member; and methods for manufacturing the same.

As used herein, the term steel sheet includes galvanized steel sheet resulting from surface galvanizing treatment.

In accordance with aspects of the present invention, 980 MPa or higher tensile strength means that the tensile strength in accordance with JIS Z2241 is 980 MPa or more.

Furthermore, the term high ductility means that the total elongation T-El in accordance with JIS Z2241 is 16.0% or more when TS is less than 1180 MPa, 14.0% or more when TS is 1180 MPa or more and less than 1320 MPa, and 13.0% or more when TS is 1320 MPa or more.

Furthermore, the term excellent stretch flange formability means that the hole expansion ratio $\lambda$ (%)=$\{(d-d_0)/d_0\}\times 100$ is 30% or more. Here, $d_0$: initial hole diameter (mm), and d: hole diameter (mm) at the occurrence of cracking. A 100 mm×100 mm square sample is punched with a punching tool having a punch diameter of 10 mm and a die diameter of 10.3 mm (13% clearance), and a conical punch having an apex angle of 60 degrees is inserted into the hole in such a manner that the burr produced at the time of punching will be directed to the outside. The hole is expanded until the sheet is cracked through the thickness.

Furthermore, the term excellent laser weldability means that a specimen obtained by laser welding described below is fractured in the base material fracture mode in a fracture mode determination test described below and satisfies HAZ strength≥base material TS+50 MPa in a notched tensile test described below.

(1) First, two steel sheet workpieces each 120 mm in the direction perpendicular to the rolling direction and 200 mm in the rolling direction are sampled from the steel sheet (the end faces are ground). The two workpieces are butted against each other so that their rolling directions are aligned. The butt position is laser welded. The gap between the butted faces is 0 mm.

(2) The laser welding is performed using Nd-YAG laser. The spot diameter at the focus position is 0.6 mm. The focus position is 4 mm above the steel sheet. The shield gas is Ar. The laser output is 4.2 kW. The welding speed is 3.7 m/min. A test piece for tensile test is sampled from the welded member in such a manner that the weld line will be perpendicular to the tensile axis and will be located at the longitudinal center of the test piece (see FIG. 1(*a*)). The test piece is subjected to a tensile test to determine the fracture mode (fracture mode determination test).

(3) When the fracture position is 2.0 mm or more away from the weld line (when even a part of the fracture position is 2.0 mm or more away from the weld line), the fracture mode is determined to be the base material fracture. When the fracture position is less than 2.0 mm away from the weld line and the test piece has been fractured by the extension of a crack along the weld line (the extension of a crack in the HAZ or the fused portion), the fracture mode is determined to be the weld fracture.

(4) Furthermore, a test piece is sampled from the welded member in such a manner that the weld line will be perpendicular to the tensile axis and will be located at the longitudinal center of the test piece, and the weld is notched (see FIG. 1(*b*)). The notched test piece is subjected to a tensile test (a notched tensile test).

(5) In the manner described above, the test pieces are deformed exclusively at the HAZ of the weld and limited regions around the HAZ and are forcibly fractured at the HAZ portion to evaluate the strength of the HAZ portion itself.

The present inventors carried out extensive studies on approaches to imparting high ductility and excellent stretch flange formability as well as excellent laser weldability and have obtained the following conclusions.

(i) After a steel slab having a predetermined chemical composition is hot rolled and cold rolled, the steel is held at an annealing temperature of 810 to 900° C. In this manner, polygonal ferrite is controlled to 10% or less in order to ensure that predetermined retained austenite (retained γ) will be present in the final microstructure.

(ii) In the annealing step, the steel that has been held is cooled in such a manner that the steel resides in a range of temperatures from 500° C. to a residence finish temperature (T1) that is equal to or higher than a martensite start temperature Ms and is equal to or higher than 320° C. for 10 seconds or more and 60 seconds or less while being cooled at an average cooling rate (CR2) of 10° C./s or less. In this manner, bainitic ferrite with little carbides, and retained γ are formed. The bainitic ferrite formed as described above is soft and insusceptible to heat during laser welding. Furthermore, carbon is efficiently partitioned from the bainitic ferrite to the retained γ during the residence. Thus, the final microstructure that is obtained can contain retained γ with a high carbon concentration that contributes to ductility enhancement.

(iii) The steel is cooled rapidly in a range of temperatures from the residence finish temperature (T1) to a finish cooling temperature (T2) of 200° C. or above and 300° C. or below at an average cooling rate (CR3) of 3 to 100° C./s before the occurrence of carbon enrichment in the remaining non-transformed γ region to $T_0$ composition that is the cause of massive microstructure formation. By this secondary cooling, the remaining non-transformed γ region is divided by martensite transformation or lower bainite transformation, with the result that retained γ is dispersed and the amount of massive microstructures is reduced.

Here, the term massive microstructures indicates fresh martensite or retained austenite that looks massive on SEM. Furthermore, the term $T_0$ composition indicates a composition in which the free energies of austenite and bainite are equal to each other and bainite transformation stops.

(iv) Subsequently, the steel is reheated in a range of temperatures from the finish cooling temperature (T2) to 380° C. at an average heating rate of 2° C./s or more, and is caused to reside in a range of temperatures of 340° C. or above and 590° C. or below for 20 seconds or more and 3000 seconds or less to convert martensite into tempered martensite as well as to further partition carbon into the retained γ that has been formed adjacent to the upper bainite during the residence in the course of the cooling process, thereby stabilizing the retained γ. Furthermore, the steel is gradually cooled at an average cooling rate (CR4) of 0.01 to 5° C./s to eliminate or reduce the formation of massive microstructures due to the excessive partitioning of carbon into the retained γ and to enhance stretch flangeability by self-tempering of fresh martensite.

The conventional difficulties in achieving both utilization of stable retained γ and the elimination or reduction of massive microstructures can be overcome by making use of bainite transformation prior to martensite transformation and further by utilizing gradual cooling after reheating.

As a result, a steel sheet can be obtained that has superior ductility and excellent stretch flange formability as well as excellent laser weldability. Furthermore, strength can be increased according to aspects of the present invention.

Aspects of the present invention have been made based on the above findings. Specifically, the present invention includes the following.

[1] A steel sheet having a chemical composition including, in mass %:

C: 0.06 to 0.25%,
Si: 0.4 to 2.5%,
Mn: 1.5 to 3.5%,
P: 0.02% or less,
S: 0.01% or less,
sol. Al: less than 1.0%, and
N: less than 0.015%,
the balance being Fe and incidental impurities,
the steel sheet being such that:
the steel sheet includes a steel microstructure including, in area fraction,
polygonal ferrite: 10% or less (including 0%),
tempered martensite: 40% or more,
fresh martensite: 20% or less (including 0%),
bainitic ferrite having 20 or less internal carbides per 10 $\mu m^2$: 3 to 40%, and, in volume fraction, retained austenite: 5 to 20%, and
the steel sheet has a proportion $S_{C\geq 0.5}/S_{C\geq 0.3}\times 100$ of 20% or more wherein $S_{C\geq 0.5}$ is the area of a region having a C concentration of 0.50% or more and $S_{C\geq 0.3}$ is the area of a region having a C concentration of 0.30% or more.

[2] The steel sheet described in [1], wherein the steel microstructure has a number density of retained austenite present adjacent to the bainitic ferrite having 20 or less internal carbides per 10 $\mu m^2$ of 50 or more per 10000 $\mu m^2$.

[3] The steel sheet described in [1] or [2], wherein the chemical composition further includes, in mass %, one or two selected from:

Ti: 0.1% or less, and
B: 0.01% or less.

[4] The steel sheet described in any of [1] to [3], wherein the chemical composition further includes, in mass %, one, or two or more selected from:

Cu: 1% or less,
Ni: 1% or less,
Cr: 1.0% or less,
Mo: 0.5% or less,
V: 0.5% or less,
Nb: 0.1% or less,
Zr: 0.2% or less, and
W: 0.2% or less.

[5] The steel sheet described in any of [1] to [4], wherein the chemical composition further includes, in mass %, one, or two or more selected from:

Ca: 0.0040% or less,
Ce: 0.0040% or less,
La: 0.0040% or less,
Mg: 0.0030% or less,
Sb: 0.1% or less, and
Sn: 0.1% or less.

[6] The steel sheet described in any of [1] to [5], which has a galvanized layer on a surface.

[7] A member obtained using the steel sheet described in any of [1] to [6].

[8] A method for manufacturing a steel sheet, including hot rolling and cold rolling a steel slab having the chemical composition described in [1], [3], [4], or [5], and annealing the cold rolled steel sheet, the annealing including:

a step of holding the steel sheet at an annealing temperature of 810 to 900° C.;

a step of cooling the steel sheet in a range of temperatures from 810° C. to 500° C. at an average cooling rate CR1 of 5 to 100° C./s;

a step of causing the steel sheet to reside in a range of temperatures from 500° C. to a residence finish temperature T1 that is equal to or higher than a martensite start temperature Ms (° C.) and is equal to or higher than 320° C. for 10 seconds or more and 60 seconds or less while cooling the steel sheet at an average cooling rate CR2 of 10° C./s or less;

a step of cooling the steel sheet in a range of temperatures from the residence finish temperature T1 to a finish cooling temperature T2 of 200° C. or above and 300° C. or below at an average cooling rate CR3 of 3 to 100° C./s;

a step of heating the steel sheet in a range of temperatures from the finish cooling temperature T2 to 380° C. at an average heating rate of 2° C./s or more;

a step of causing the steel sheet to reside in a range of temperatures of 340° C. or above and 590° C. or below for 20 seconds or more and 3000 seconds or less while cooling the steel sheet at an average cooling rate CR4 of 0.01 to 5° C./s; and a step of cooling the steel sheet to a temperature of 50° C. or below at an average cooling rate CR5 of 0.1° C./s or more.

[9] The method for manufacturing a steel sheet described in [8], wherein the step of causing the steel sheet to reside at an average cooling rate CR4 of 0.01 to 5° C./s includes performing a hot-dip galvanizing treatment or a hot-dip galvannealing treatment.

[10] The method for manufacturing a steel sheet described in [8], further including a step of performing an electrogalvanizing treatment after the step of cooling the steel sheet at an average cooling rate CR5 of 0.1° C./s or more.

[11] A method for manufacturing a member, including a step of subjecting the steel sheet described in any of [1] to [6] to at least one working of forming and joining to produce a member.

According to aspects of the present invention, a steel sheet having high ductility, excellent stretch flange formability, and excellent laser weldability, and a related member can be obtained. Furthermore, strength can be increased according to aspects of the present invention. The steel sheet according to aspects of the present invention may be applied to an automotive part to realize weight reduction of the automotive part. Enhanced fuel efficiency is thus expected.

DETAILED DESCRIPTION OF EMBODIMENTS OF THE INVENTION

Figure 1:
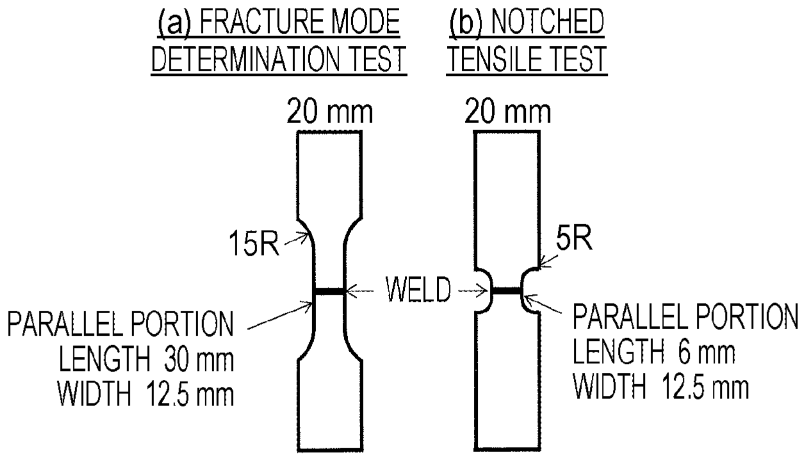
FIG. 1 is a set of views illustrating a manner for evaluating the laser weldability of a steel sheet according to aspects of the present invention.

Embodiments of the present invention will be described in detail below. The present invention is not limited to the embodiments described below.

A steel sheet according to aspects of the present invention has a chemical composition including, in mass %, C: 0.06 to 0.25%, Si: 0.4 to 2.5%, Mn: 1.5 to 3.5%, P: 0.02% or less, S: 0.01% or less, sol. Al: less than 1.0%, and N: less than 0.015%, the balance being Fe and incidental impurities. The steel sheet includes a steel microstructure including, in area fraction, polygonal ferrite: 10% or less (including 0%), tempered martensite: 40% or more, fresh martensite: 20% or less (including 0%), bainitic ferrite having 20 or less internal carbides per 10 $\mu m^2$: 3 to 40%, and, in volume fraction, retained austenite: 5 to 20%. The steel sheet has a proportion $S_{C\geq0.5}/S_{C\geq0.3}\times100$ of 20% or more wherein $S_{C\geq0.5}$ is the area of a region having a C concentration of 0.50% or more and $S_{C\geq0.3}$ is the area of a region having a C concentration of 0.30% or more.

The steel sheet according to aspects of the present invention will be described below in the order of its chemical composition and its steel microstructure.

The steel sheet according to aspects of the present invention includes the components described below. In the following description, the unit "%" for the contents of components means "mass %".

C: 0.06 to 0.25%

Carbon is added to ensure predetermined strength by ensuring an area fraction of tempered martensite, to enhance ductility by ensuring a volume fraction of retained γ, and to stabilize retained γ by being concentrated in retained γ and thereby to enhance ductility. Furthermore, the addition of carbon increases the strength of a fused portion of a welded joint and a portion quenched from γ region, and thereby can eliminate or reduce deformation occurring at HAZ and enhance the HAZ softening resistance. When the C content is less than 0.06%, these effects cannot be ensured sufficiently. Thus, the lower limit is limited to 0.06%. The C content is preferably 0.09% or more, and more preferably 0.11% or more. When the C content exceeds 0.25%, upper bainite transformation during intermediate holding in the course of cooling is retarded, and it becomes difficult to form a predetermined amount of retained γ that is adjacent to upper bainite. As a result, ductility is lowered. Furthermore, the amount of massive martensite or massive retained γ is increased to deteriorate stretch flange formability. Furthermore, laser welding characteristics of the steel sheet, such as HAZ softening resistance, spot weldability, bendability, and flangeability, are significantly deteriorated. Thus, the upper limit of the C content is limited to 0.25%. From the points of view of ductility and HAZ softening resistance, the C content is preferably 0.22% or less. In order to further improve ductility and HAZ softening resistance, the C content is more preferably 0.20% or less.

Si: 0.4 to 2.5%

Silicon is added to offer high strength by strengthening ferrite, to enhance the stability of retained γ by suppressing the formation of carbides in martensite and bainite and thereby to enhance ductility, and to enhance the HAZ softening resistance of a weld by increasing the amount of solid solution strengthening that is insusceptible to heat. From the points of view of the above, the Si content is limited to 0.4% or more. In order to enhance ductility, the Si content is preferably 0.6% or more. More preferably, the Si content is 0.8% or more. When the Si content exceeds 2.5%, the rolling load at the time of hot rolling is extremely increased to make sheet production difficult. Furthermore, chemical convertibility and weld toughness are deteriorated. For these reasons, the Si content is limited to 2.5% or less. To ensure chemical convertibility and the toughness of the base material and a weld, the Si content is preferably less than 2.0%. To ensure weld toughness, the Si content is preferably 1.8% or less, and more preferably 1.5% or less.

Mn: 1.5 to 3.5%

Manganese is an important element from the points of view of ensuring strength by ensuring a predetermined area fraction of tempered martensite and/or bainite; improving ductility by lowering the Ms temperature of retained γ and thereby stabilizing retained γ; enhancing ductility by suppressing the formation of carbides in bainite similarly to silicon; and enhancing ductility by increasing the volume fraction of retained γ. In order to obtain these effects, the Mn content is limited to 1.5% or more. In order to enhance ductility by stabilizing retained γ, the Mn content is preferably 2.5% or more. The Mn content is preferably 2.6% or more, and more preferably 2.7% or more. When the Mn content exceeds 3.5%, bainite transformation is significantly retarded to lower ductility and HAZ softening resistance. When the Mn content exceeds 3.5%, moreover, it becomes difficult to suppress the formation of massive coarse γ and massive coarse martensite, resulting in a decrease in stretch flange formability. Thus, the Mn content is limited to 3.5% or less. In order to ensure high ductility by promoting bainite transformation, the Mn content is preferably 3.2% or less. More preferably, the Mn content is 3.1% or less.

P: 0.02% or Less

Phosphorus is an element that strengthens steel, but much phosphorus deteriorates spot weldability. Thus, the P content is limited to 0.02% or less. In order to improve spot weldability, the P content is preferably 0.01% or less. The P content may be nil. From the point of view of manufacturing cost, the P content is preferably 0.001% or more.

S: 0.01% or Less

Sulfur is an element that is effective in improving scale exfoliation in hot rolling and effective in suppressing nitridation during annealing, but sulfur lowers spot weldability, bendability, and flangeability. From the points of view of the above, the S content is limited to 0.01% or less. In accordance with aspects of the present invention, the contents of C, Si, and Mn are high and spot weldability tends to be lowered. In order to improve spot weldability, the S content is preferably 0.0020% or less, and more preferably less than 0.0010%. The S content may be nil. From the point of view of manufacturing cost, the S content is preferably 0.0001% or more. More preferably, the S content is 0.0005% or more.

Sol. Al: Less than 1.0%

Aluminum is added for the purposes of deoxidization and stabilizing retained γ as a substitute for silicon. The lower limit of the sol. Al content is not particularly limited. For stable deoxidization, the sol. Al content is preferably 0.005% or more. The sol. Al content is more preferably 0.01% or more. On the other hand, 1.0% or more sol. Al significantly lowers the strength of the base material and also affects adversely chemical convertibility. Thus, the sol. Al content is limited to less than 1.0%. In order to obtain high strength, the sol. Al content is more preferably less than 0.50%, and still more preferably 0.20% or less.

N: Less than 0.015%

Nitrogen is an element that forms nitrides, such as BN, AlN, and TiN, in steel. This element lowers the hot ductility of steel and lowers the surface quality. Furthermore, in B-containing steel, nitrogen has a harmful effect in eliminating the effect of boron through the formation of BN. The surface quality is significantly deteriorated when the N content is 0.015% or more. Thus, the N content is limited to less than 0.015%. The N content is preferably 0.010% or less. The N content may be nil. From the point of view of manufacturing cost, the N content is preferably 0.0001% or more. More preferably, the N content is 0.001% or more.

The balance after the above components is Fe and incidental impurities. The steel sheet according to aspects of the present invention preferably has a chemical composition that contains the basic components described above, with the balance consisting of iron (Fe) and incidental impurities.

In addition to the above components, the chemical composition of the steel sheet according to aspects of the present invention may appropriately include one, or two or more optional elements selected from the following (A), (B), and (C):

(A) in mass %, one or two selected from Ti: 0.1% or less and B: 0.01% or less, (B) in mass %, one, or two or more selected from Cu: 1% or less, Ni: 1% or less, Cr: 1.0% or less, Mo: 0.5% or less, V: 0.5% or less, Nb: 0.1% or less, Zr: 0.2% or less, and W: 0.2% or less, (C) in mass %, one, or two or more selected from Ca: 0.0040% or less, Ce: 0.0040% or less, La: 0.0040% or less, Mg: 0.0030% or less, Sb: 0.1% or less, and Sn: 0.1% or less.

Ti: 0.1% or Less

Titanium fixes nitrogen in steel as TiN to produce an effect of enhancing hot ductility and an effect of allowing boron to produce its effect of enhancing hardenability. Furthermore, titanium has an effect of reducing the size of the microstructure through TiC precipitation. In order to obtain these effects, the Ti content is preferably 0.002% or more. In order to fix nitrogen sufficiently, the Ti content is more preferably 0.008% or more. The Ti content is still more preferably 0.010% or more. On the other hand, more than 0.1% titanium may cause an increase in rolling load and a decrease in ductility by an increased amount of precipitation strengthening. Thus, when titanium is added, the Ti content is limited to 0.1% or less. Preferably, the Ti content is 0.05% or less. In order to ensure high ductility, the Ti content is more preferably 0.03% or less.

B: 0.01% or Less

Boron is an element that enhances the hardenability of steel and facilitates the formation of a predetermined area fraction of tempered martensite and/or bainite. Furthermore, boron enhances the hardenability in the vicinity of a weld and allows a hard microstructure to be formed in the vicinity of the weld, thereby enhancing HAZ softening resistance. Furthermore, residual solute boron enhances delayed fracture resistance. In order to obtain these effects of boron, the B content is preferably 0.0002% or more. The B content is more preferably 0.0005% or more. Still more preferably, the B content is 0.0010% or more. When, on the other hand, the B content exceeds 0.01%, the effects are saturated, and further hot ductility is significantly lowered to invite surface defects. Thus, when boron is added, the B content is limited to 0.01% or less. Preferably, the B content is 0.0050% or less. More preferably, the B content is 0.0030% or less.

Cu: 1% or Less

Copper enhances the corrosion resistance in automobile use environments. Furthermore, corrosion products of copper cover the surface of the steel sheet and can suppress penetration of hydrogen into the steel sheet. Copper is an element that is mixed when scraps are used as raw materials. By accepting copper contamination, recycled materials can be used as raw materials and thereby manufacturing costs can be reduced. From these points of view, the Cu content is preferably 0.005% or more, and, further from the point of view of enhancing delayed fracture resistance, the Cu content is more preferably 0.05% or more. Still more preferably, the Cu content is 0.10% or more. On the other hand, too much copper invites surface defects. Thus, when copper is added, the Cu content is limited to 1% or less. The Cu content is preferably 0.4% or less, and more preferably 0.2% or less.

Ni: 1% or Less

Similar to copper, nickel can enhance corrosion resistance. Furthermore, nickel can also eliminate or reduce the occurrence of surface defects that tend to occur when the steel contains copper. To benefit from these effects, it is preferable to add 0.01% or more nickel. The Ni content is more preferably 0.04% or more, and still more preferably 0.06% or more. On the other hand, adding too much nickel can instead cause surface defects because scales are formed nonuniformly in a heating furnace, and also increases the cost. Thus, when nickel is added, the Ni content is limited to 1% or less. The Ni content is preferably 0.4% or less, and more preferably 0.2% or less.

Cr: 1.0% or Less

Chromium may be added to produce an effect of enhancing the hardenability of steel and an effect of suppressing the formation of carbides in martensite and upper/lower bainite. Furthermore, chromium enhances the hardenability in the vicinity of a weld and allows a hard phase to be formed in the vicinity of the weld, thereby enhancing HAZ softening resistance. In order to obtain these effects, the Cr content is preferably 0.01% or more. The Cr content is more preferably 0.03% or more, and still more preferably 0.06% or more. On the other hand, too much chromium deteriorates pitting corrosion resistance. Thus, when chromium is added, the Cr content is limited to 1.0% or less. The Cr content is preferably 0.8% or less, and more preferably 0.4% or less.

Mo: 0.5% or Less

Molybdenum may be added to produce an effect of enhancing the hardenability of steel and an effect of suppressing the formation of carbides in martensite and upper/lower bainite. Furthermore, molybdenum enhances the hardenability in the vicinity of a weld and allows a hard phase to be formed in the vicinity of the weld, thereby enhancing HAZ softening resistance. In order to obtain these effects, the Mo content is preferably 0.01% or more. The Mo content is more preferably 0.03% or more, and still more preferably 0.06% or more. On the other hand, molybdenum significantly deteriorates the chemical convertibility of the cold rolled steel sheet. Thus, when molybdenum is added, the Mo content is limited to 0.5% or less. From the point of view of enhancing chemical convertibility, the Mo content is preferably 0.15% or less.

V: 0.5% or Less

Vanadium may be added to produce an effect of enhancing the hardenability of steel, an effect of suppressing the formation of carbides in martensite and upper/lower bainite, an effect of reducing the size of the microstructure, and an effect of improving delayed fracture resistance through the precipitation of carbide. Furthermore, vanadium enhances the hardenability in the vicinity of a weld and allows a hard phase to be formed in the vicinity of the weld, thereby enhancing HAZ softening resistance. In order to obtain these effects, the V content is preferably 0.003% or more. The V content is more preferably 0.005% or more, and still more preferably 0.010% or more. On the other hand, much vanadium significantly deteriorates castability. Thus, when vanadium is added, the V content is limited to 0.5% or less. The V content is preferably 0.3% or less, and more preferably 0.1% or less. The V content is still more preferably 0.05% or less, and further preferably 0.03% or less.

Nb: 0.1% or Less

Niobium may be added to produce an effect of reducing the size of the steel microstructure and thereby increasing the strength, and, through grain size reduction, an effect of promoting bainite transformation, an effect of improving bendability, and an effect of enhancing delayed fracture resistance. Furthermore, niobium enhances the hardenability in the vicinity of a weld and allows a hard phase to be formed in the vicinity of the weld, thereby enhancing HAZ softening resistance. In order to obtain these effects, the Nb content is preferably 0.002% or more. The Nb content is more preferably 0.004% or more, and still more preferably 0.010% or more. On the other hand, adding much niobium results in excessive precipitation strengthening and low ductility. Furthermore, the rolling load is increased and castability is deteriorated. Thus, when niobium is added, the Nb content is limited to 0.1% or less. The Nb content is preferably 0.05% or less, and more preferably 0.03% or less.

Zr: 0.2% or Less

Zirconium may be added to produce an effect of enhancing the hardenability of steel, an effect of suppressing the formation of carbides in bainite, an effect of reducing the size of the microstructure, and an effect of improving delayed fracture resistance through the precipitation of carbide. In order to obtain these effects, the Zr content is preferably 0.005% or more. The Zr content is more preferably 0.008% or more, and still more preferably 0.010% or more. When, on the other hand, the steel contains much zirconium, increased amounts of coarse precipitates, such as ZrN and ZrS, remain undissolved at the time of slab heating before hot rolling to cause deterioration in delayed fracture resistance. Thus, when zirconium is added, the Zr content is limited to 0.2% or less. The Zr content is preferably 0.15% or less, and more preferably 0.08% or less. The Zr content is still more preferably 0.03% or less, and further preferably 0.02% or less.

W: 0.2% or Less

Tungsten may be added to produce an effect of enhancing the hardenability of steel, an effect of suppressing the formation of carbides in bainite, an effect of reducing the size of the microstructure, and an effect of improving delayed fracture resistance through the precipitation of carbide. In order to obtain these effects, the W content is preferably 0.005% or more. The W content is more preferably 0.008% or more, and still more preferably 0.010% or more.

When, on the other hand, the steel contains much tungsten, increased amounts of coarse precipitates, such as WN and WS, remain undissolved at the time of slab heating before hot rolling to cause deterioration in delayed fracture resistance. Thus, when tungsten is added, the W content is limited to 0.2% or less. The W content is preferably 0.15% or less, and more preferably 0.08% or less. The W content is still more preferably 0.03% or less, and further preferably 0.02% or less.

Ca: 0.0040% or Less

Calcium fixes sulfur as CaS and contributes to improvements in bendability and delayed fracture resistance. Thus, the Ca content is preferably 0.0002% or more. The Ca content is more preferably 0.0005% or more, and still more preferably 0.0010% or more. On the other hand, much calcium deteriorates surface quality and bendability. Thus, when calcium is added, the Ca content is limited to 0.0040% or less. The Ca content is preferably 0.0035% or less, and more preferably 0.0020% or less.

Ce: 0.0040% or Less

Similar to calcium, cerium fixes sulfur and contributes to improvements in bendability and delayed fracture resistance. Thus, the Ce content is preferably 0.0002% or more. The Ce content is more preferably 0.0004% or more, and still more preferably 0.0006% or more. On the other hand, much cerium deteriorates surface quality and bendability. Thus, when cerium is added, the Ce content is limited to 0.0040% or less. The Ce content is preferably 0.0035% or less, and more preferably 0.0020% or less.

La: 0.0040% or Less

Similar to calcium, lanthanum fixes sulfur and contributes to improvements in bendability and delayed fracture resistance. Thus, the La content is preferably 0.0002% or more. The La content is more preferably 0.0004% or more, and still more preferably 0.0006% or more. On the other hand, much lanthanum deteriorates surface quality and bendability. Thus, when lanthanum is added, the La content is limited to 0.0040% or less. The La content is preferably 0.0035% or less, and more preferably 0.0020% or less.

Mg: 0.0030% or Less

Magnesium fixes oxygen as MgO and contributes to improvement in delayed fracture resistance. Thus, the Mg content is preferably 0.0002% or more. The Mg content is more preferably 0.0004% or more, and still more preferably 0.0006% or more. On the other hand, much magnesium deteriorates surface quality and bendability. Thus, when magnesium is added, the Mg content is limited to 0.0030% or less. The Mg content is preferably 0.0025% or less, and more preferably 0.0010% or less.

Sb: 0.1% or Less

Antimony suppresses oxidation and nitridation of a superficial portion of the steel sheet and thereby eliminates or reduces the loss of the C and B contents in the superficial portion. Furthermore, the elimination or reduction of the loss of the C and B contents leads to suppressed formation of ferrite in the superficial portion of the steel sheet, thus increasing strength and improving delayed fracture resistance. From these points of view, the Sb content is preferably 0.002% or more. The Sb content is more preferably 0.004% or more, and still more preferably 0.006% or more. When, on the other hand, the Sb content exceeds 0.1%, castability is deteriorated and segregation occurs at prior γ grain boundaries to deteriorate the delayed fracture resistance of sheared end faces. Thus, when antimony is added, the Sb content is limited to 0.1% or less. The Sb content is preferably 0.04% or less, and more preferably 0.03% or less.

Sn: 0.1% or Less

Tin suppresses oxidation and nitridation of a superficial portion of the steel sheet and thereby eliminates or reduces the loss of the C and B contents in the superficial portion. Furthermore, the elimination or reduction of the loss of the C and B contents leads to suppressed formation of ferrite in the superficial portion of the steel sheet, thus increasing strength and improving delayed fracture resistance. From these points of view, the Sn content is preferably 0.002% or more. The Sn content is preferably 0.004% or more, and more preferably 0.006% or more. When, on the other hand, the Sn content exceeds 0.1%, castability is deteriorated. Furthermore, tin is segregated at prior γ grain boundaries to deteriorate the delayed fracture resistance of sheared end faces. Thus, when tin is added, the Sn content is limited to 0.1% or less. The Sn content is preferably 0.04% or less, and more preferably 0.03% or less.

When the content of any of the above optional components is below the preferred lower limit, the optional element present below the lower limit does not impair the advantageous effects according to aspects of the present invention. Thus, such an optional element below the preferred lower limit content is regarded as an incidental impurity.

Next, the steel microstructure of the steel sheet according to aspects of the present invention will be described.

Polygonal ferrite: 10% or less (including 0%) Polygonal ferrite, which is formed during annealing or a cooling process, contributes to enhancement in ductility but decreases stretch flange formability by giving rise to a difference in hardness from surrounding hard phases, such as martensite. Polygonal ferrite does not impair the advantageous effects according to aspects of the present invention as long as the area fraction thereof is 10% or less and therefore, polygonal ferrite may be contained up to 10% or less in area fraction. Thus, in accordance with aspects of the present invention, the area fraction of polygonal ferrite is limited to 10% or less. The polygonal ferrite is preferably 5% or less, and more preferably 2% or less. The polygonal ferrite may be 0%.

Tempered Martensite: 40% or More

In order to obtain predetermined strength and stretch flange formability, the area fraction of tempered martensite is limited to 40% or more. The tempered martensite is preferably 50% or more. When, on the other hand, the tempered martensite exceeds 80%, the strength is excessively increased and the ductility is lowered. Thus, the tempered martensite is preferably 80% or less. The tempered martensite is more preferably 75% or less.

Fresh Martensite: 20% or Less (Including 0%)

The final tempering step (the residence step at an average cooling rate CR4 described later) to produce a large amount of bainite transformation conventionally results in a large amount of massive martensite or massive retained γ that remains. The conventional approach to preventing this is to reduce the amount of manganese and thereby to promote bainite transformation. However, decreasing the Mn content lowers ductility because of the loss of the effects of stabilizing retained γ and increasing the volume fraction of retained γ. In contrast, aspects of the present invention perform an appropriate cooling treatment on the steel sheet containing a large amount of manganese, and thereby can make use of bainite transformation and reduce the occurrence of massive microstructures at the same time.

Excellent stretch flange formability and HAZ softening resistance can be ensured by reducing the area fraction of massive fresh martensite microstructures to 20% or less. Thus, the area fraction of fresh martensite in accordance with aspects of the present invention is limited to 20% or less. In order to ensure excellent stretch flange formability and HAZ softening resistance, the fresh martensite is preferably 10% or less. The fresh martensite is more preferably 5% or less. The fresh martensite may be 0%.

Bainitic Ferrite Having 20 or Less Internal Carbides Per 10 $\mu m^2$: 3 to 40%

When bainitic ferrite having 20 or less internal carbides per 10 $\mu m^2$ are present with an area fraction of 3% or more, carbon is efficiently concentrated into surrounding retained γ. Furthermore, such bainitic ferrite is insusceptible to heat at the time of laser welding and contributes to enhancement in HAZ softening resistance. Thus, in accordance with aspects of the present invention, the area fraction of bainitic ferrite having 20 or less internal carbides per 10 $\mu m^2$ is limited to 3% or more. The bainitic ferrite is preferably 5% or more, and more preferably 7% or more. In order to reduce the decrease in strength, the area fraction of bainitic ferrite having 20 or less internal carbides per 10 $\mu m^2$ is limited to 40% or less.

The area fraction is preferably 30% or less, and more preferably 25% or less.

In accordance with aspects of the present invention, the steel may contain bainitic ferrite having more than 20 internal carbides per 10 μm$^2$.

Microstructure Including One, or Two or More of Tempered Martensite, Fresh Martensite, Upper Bainite, Lower Bainite, and Retained Austenite: 90% or More (Including 100%)

In order to ensure predetermined strength, ductility, and stretch flange formability, it is preferable that the remaining microstructure after the polygonal ferrite have a total area fraction of tempered martensite, fresh martensite, upper bainite, lower bainite, and retained austenite of 90% or more. The remaining microstructure may be a microstructure including one, or two or more of tempered martensite, fresh martensite, upper bainite, lower bainite, and retained austenite, or may be a microstructure consisting of one, or two or more of tempered martensite, fresh martensite, upper bainite, lower bainite, and retained austenite.

The upper bainite and the lower bainite include bainitic ferrite having 20 or less internal carbides per 10 μm$^2$. The upper bainite and the lower bainite may include bainitic ferrite having more than 20 internal carbides per 10 μm$^2$.

Retained Austenite: 5 to 20%

In order to ensure high ductility, the volume fraction of retained austenite (retained γ) is limited to 5% or more of the entire steel microstructure. The retained austenite is preferably 7% or more, and more preferably 9% or more. This amount of retained γ includes retained γ formed adjacent to bainite. An excessively large amount of retained γ invites decreases in strength, stretch flange formability, and delayed fracture resistance. Thus, the volume fraction of retained γ is limited to 20% or less. The retained austenite is preferably 15% or less. Incidentally, the "volume fraction" may be regarded as the "area fraction".

Proportion $S_{C\geq 0.5}/S_{C\geq 0.3}\times 100$ of 20% or More where $S_{C\geq 0.5}$ is the Area of a Region Having a C Concentration of 0.50% (Mass %) or More and $S_{C\geq 0.3}$ is the Area of a Region Having a C Concentration of 0.30% (Mass %) or More In order to ensure high ductility, the proportion $S_{C\geq 0.5}/S_{C\geq 0.3}\times 100$ is limited to 20% or more. Here, $S_{C\geq 0.5}$ is the area of a region having a C concentration of 0.50% or more and $S_{C\geq 0.3}$ is the area of a region having a C concentration of 0.30% or more. The proportion is preferably 25% or more, and more preferably 30% or more.

(Preferred Requirement) Number Density of Retained Austenite Present Adjacent to Bainitic Ferrite Having 20 or Less Internal Carbides Per 10 μm$^2$: 50 or More Per 10000 μm$^2$ In the formation of bainitic ferrite having 20 or less internal carbides per 10 μm$^2$, carbon is efficiently partitioned to adjacent non-transformed austenite, and consequently retained γ in the final microstructure attains a high carbon concentration and can contribute to enhancement in ductility. From the point of view of ensuring higher ductility, it is preferable in accordance with aspects of the present invention that the number density of retained austenite present adjacent to bainitic ferrite having 20 or less internal carbides per 10 μm$^2$ be 50 or more per 10000 μm$^2$. More preferably, the number density is 70 or more, and still more preferably 100 or more per 10000 μm$^2$. To avoid a decrease in strength due to excessive formation of retained γ, the number density of retained austenite present adjacent to bainitic ferrite having 20 or less internal carbides per 10 μm$^2$ is preferably 400 or less, and more preferably 300 or less per 10000 μm$^2$.

Next, a method for measuring the steel microstructure of the steel sheet according to aspects of the present invention will be described.

Figure 2:
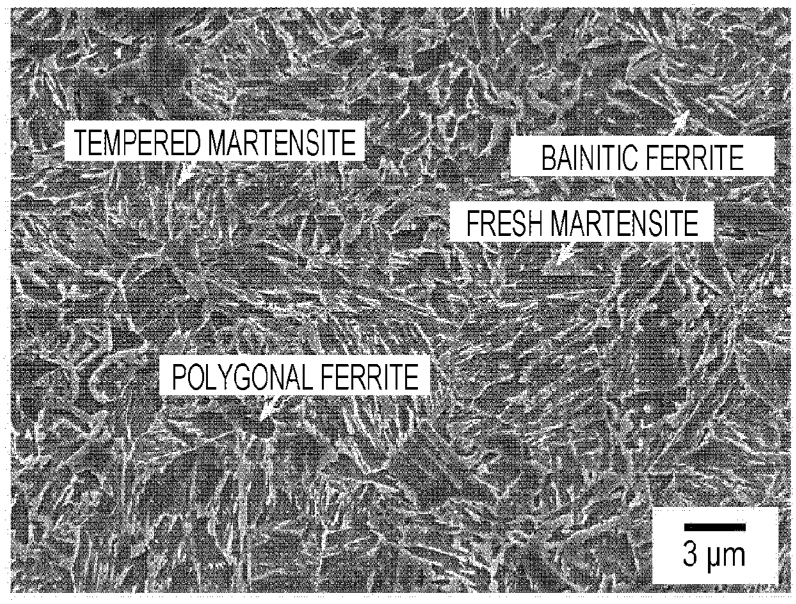
FIG. 2 is an example SEM image of a steel microstructure of a steel sheet.

To measure the area fractions of polygonal ferrite, bainitic ferrite, tempered martensite, and fresh martensite, the steel sheet is cut to expose a through-thickness cross section that is perpendicular to the steel sheet surface and is parallel to the rolling direction. The cross section is mirror-polished and is etched with 3 vol % Nital. Portions at ¼ thickness are observed with SEM in 10 fields of view at a magnification of 5000 times. FIG. 2 illustrates an example SEM image of the steel microstructure of the steel sheet. As illustrated in FIG. 2, the polygonal ferrite discussed here is relatively equiaxed ferrite containing almost no internal carbides. This region looks blackest in SEM. Bainitic ferrite is a ferrite microstructure that contains internal carbide or retained γ which looks white in SEM.

When determination is difficult whether the ferrite is bainitic ferrite or polygonal ferrite, the area fractions are calculated while assuming that the region is polygonal ferrite when the aspect ratio is ≤2.0 and the region is bainitic ferrite when the aspect ratio is >2.0.

Figure 3:
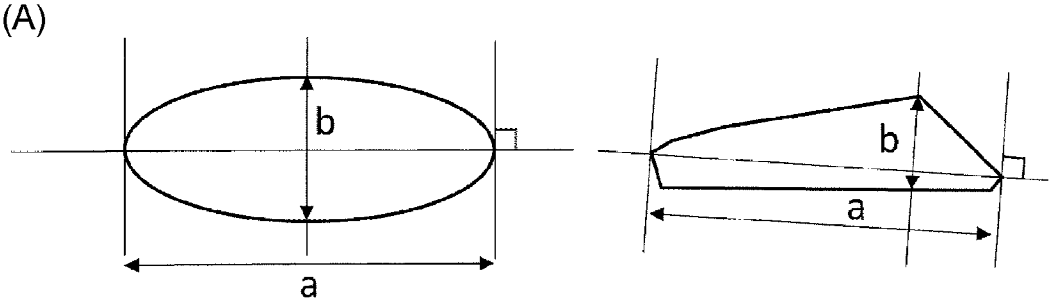
FIG. 3 is a set of views illustrating a manner for measuring a steel microstructure of a steel sheet according to aspects of the present invention.
Figure 3:
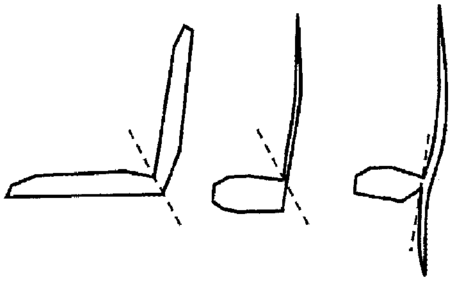

FIG. 3 is a set of views illustrating a manner for measuring the steel microstructure of the steel sheet according to aspects of the present invention. As illustrated in FIG. 3(A), the aspect ratio is obtained from a/b in which a is the major axis length where the particle length is longest, and b is the minor axis length that cuts across the particle over the largest length perpendicular to the major axis length. When particles are in contact with one another, as illustrated in FIG. 3(B), the particles are divided at a position that divides the particles approximately evenly and the sizes of the respective particles are measured.

The number of internal carbides in bainitic ferrite per 10 μm$^2$ can be determined by measuring the area of bainitic ferrite and counting the number of internal carbides in a ×5000 SEM image, dividing the carbide count by the area of bainitic ferrite, and converting the quotient into the value per 10 μm$^2$.

Tempered martensite is a region that contains a lath-like submicrostructure and carbide precipitates according to SEM. Fresh martensite is a massive region that looks white and does not contain any visible submicrostructures according to SEM.

The microstructure including one, or two or more of tempered martensite, fresh martensite, upper bainite, lower bainite, and retained austenite corresponds to the remaining microstructure after the polygonal ferrite, and the total area fraction of this microstructure is the area fraction of the regions other than the polygonal ferrite. Here, the area fraction of carbides is very small and is thus included in the above area fraction of the remaining microstructure.

The volume fraction of retained austenite (retained γ) was determined by chemically polishing the steel sheet surface to a location at ¼ thickness and analyzing the sheet surface by X-ray diffractometry. Co-Kα radiation source is used as the incident X-ray, and the volume fraction of retained austenite is calculated from the intensity ratio of (200), (211), and (220) planes of ferrite and (200), (220), and (311) planes of austenite. Because retained γ is randomly distributed, the volume fraction of retained γ obtained by X-ray diffractometry is equal to the area fraction of retained γ in the steel microstructure.

The number density of retained austenite present adjacent to bainitic ferrite having 20 or less internal carbides per 10 μm$^2$ is determined as follows. The sample used for bainitic ferrite observation is mirror-polished. An electron backscattering diffraction pattern (EBSD) of the same field of view as obtained in SEM is subjected to mapping measurement using EBSD analysis program OIM Data Collection ver. 7. The obtained data is analyzed using TSL OIM Analysis ver. 7 (manufactured by EDAX/TSL) to give phase map data.

The number density of fcc structures present adjacent to bainitic ferrite having 20 or less internal carbides per 10 μm$^2$ is measured. Here, the term “adjacent” means that the fcc structures are in contact with bcc structures corresponding to bainitic ferrite having 20 or less internal carbides per 10 μm$^2$ in the phase map. The fcc structure may be included in the bcc structure.

The area $S_{C\geq 0.5}$ of a region having a C concentration of 0.50% (mass %) or more and the area $S_{C\geq 0.3}$ of a region having a C concentration of 0.30% (mass %) or more are measured by mapping analysis of the C concentration distribution with respect to positions at ¼ thickness of a through-thickness cross section perpendicular to the steel sheet surface and parallel to the rolling direction, using field emission electron probe microanalyzer (FE-EPMA) JXA-8500F manufactured by JEOL Ltd., at an acceleration voltage of 6 kV and an illumination current of $7\times10^{-8}$ A with the minimum beam diameter. In order to eliminate the influence of contamination, the background is subtracted so that the average value of carbon obtained by the analysis will be equal to the amount of carbon in the base material. Specifically, when the average of the measured amounts of carbon is greater than the amount of carbon in the base material, the excess is understood as contamination, and the excess is subtracted from each of the values analyzed at the respective positions. The values thus obtained are taken as the true amounts of carbon at the respective positions.

The steel sheet according to aspects of the present invention preferably has a tensile strength of 980 MPa or more. More preferably, the tensile strength is 1180 MPa or more. The upper limit of the tensile strength is preferably 1450 MPa or less from the point of view of compatibility with other characteristics, and is more preferably 1400 MPa or less.

In the steel sheet according to aspects of the present invention, the total elongation T-El is 16.0% or more when TS is less than 1180 MPa, 14.0% or more when TS is 1180 MPa or more and less than 1320 MPa, and 13.0% or more when TS is 1320 MPa or more. With this configuration, forming stability is markedly enhanced. It is preferable to ensure that the hole expansion ratio λ is 30% or more. From the point of view of compatibility with other characteristics, the upper limit of A is preferably 90% or less, and more preferably 80% or less at any level of strength.

The steel sheet according to aspects of the present invention is preferably such that a specimen obtained by laser welding is fractured in the base material fracture mode in a fracture mode determination test and satisfies HAZ strength≥base material TS+50 MPa in a notched tensile test.

The steel sheet according to aspects of the present invention described above may be a steel sheet having a galvanized layer on a surface. The galvanized layer may be a hot-dip galvanized layer or an electrogalvanized layer.

Next, a method for manufacturing the steel sheet according to aspects of the present invention will be described.

In a method for manufacturing the steel sheet according to aspects of the present invention, a steel slab having the chemical composition described hereinabove is hot rolled and cold rolled. The cold rolled steel sheet obtained is annealed. The annealing includes the following steps in the order named: a step of holding the steel sheet at an annealing temperature of 810 to 900° C.; a step of cooling the steel sheet in a range of temperatures from 810° C. to 500° C. at an average cooling rate (CR1) of 5 to 100° C./s; a step of causing the steel sheet to reside in a range of temperatures from 500° C. to a residence finish temperature (T1) that is equal to or higher than a martensite start temperature Ms (° C.) and is equal to or higher than 320° C. for 10 seconds or more and 60 seconds or less while cooling the steel sheet at an average cooling rate (CR2) of 10° C./s or less; a step of cooling the steel sheet in a range of temperatures from the residence finish temperature (T1) to a finish cooling temperature (T2) of 200° C. or above and 300° C. or below at an average cooling rate (CR3) of 3 to 100° C./s; a step of heating the steel sheet in a range of temperatures from the finish cooling temperature (T2) to 380° C. at an average heating rate of 2° C./s or more; a step of causing the steel sheet to reside in a range of temperatures of 340° C. or above and 590° C. or below for 20 seconds or more and 3000 seconds or less while cooling the steel sheet at an average cooling rate (CR4) of 0.01 to 5° C./s; and a step of cooling the steel sheet to a temperature of 50° C. or below at an average cooling rate (CR5) of 0.1° C./s or more.

The temperatures specified in the steps in accordance with aspects of the present invention indicate the surface temperatures of the slab (steel slab) or the steel sheet.

Figure 4:
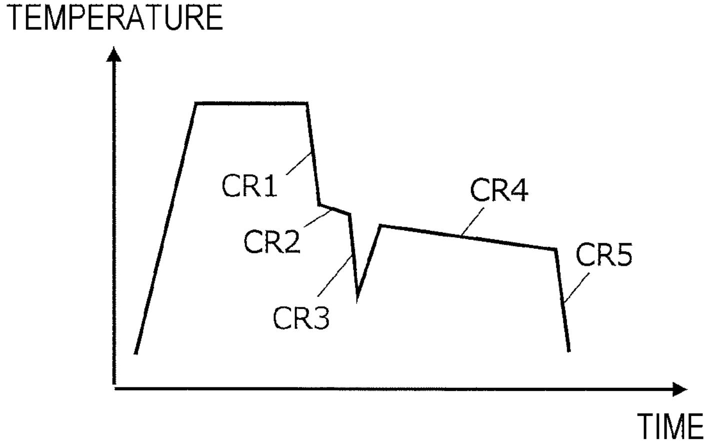
FIG. 4 is a diagram illustrating a method for manufacturing a steel sheet according to aspects of the present invention.

FIG. 4 is a diagram illustrating the method for manufacturing the steel sheet according to aspects of the present invention, in particular, indicating changes in surface temperature of the slab (steel slab) or the steel sheet with time. The details of the steps, including the changes in temperature with time, will be described below.

Hot Rolling

For example, the steel slab may be hot rolled in such a manner that the slab is heated and then rolled, that the slab from continuous casting is subjected to hot direct rolling without heating, or that the slab from continuous casting is quickly heat treated and then rolled. The hot rolling may be performed in accordance with a conventional procedure. For example, the slab heating temperature may be 1100 to 1300° C.; the soaking time may be 20 to 300 minutes; the finish rolling temperature may be $Ar_3$ transformation temperature to $Ar_3$ transformation temperature+200° C.; and the coiling temperature may be 400 to 720° C. In order to eliminate or reduce thickness variations and to ensure high strength stably, the coiling temperature is preferably 430 to 530° C.

Cold Rolling

In cold rolling, the rolling reduction ratio (the cumulative rolling reduction ratio) may be 30 to 85%. In order to ensure high strength stably and to reduce anisotropy, the rolling reduction ratio is preferably 35 to 85%. When a high rolling load is incurred, a softening annealing treatment may be performed on CAL (a continuous annealing line) or in BAF (a box annealing furnace) at 450 to 730° C.

Annealing

After the steel slab having the aforementioned chemical composition is hot rolled and cold rolled, the steel sheet is annealed under the conditions specified below. The annealing facility is not particularly limited, but a continuous annealing line (CAL) or a continuous galvanizing line (CGL) is preferable from the points of view of productivity and ensuring the desired heating rate and cooling rate.

Holding at an Annealing Temperature of 810 to 900° C.

In order to ensure the predetermined area fraction of tempered martensite and/or bainite and to ensure the predetermined volume fraction of retained γ, the annealing temperature is limited to 810 to 900° C. In order to control polygonal ferrite to 5% or less, the annealing temperature is preferably adjusted so that the annealing will take place in the γ single-phase region. The annealing temperature is preferably 815° C. or above. When, on the other hand, the annealing temperature exceeds 900° C., the γ grain size is excessively increased to extend the distance of diffusion of carbon atoms required to obtain retained γ having the desired carbon concentration, resulting in a decrease in ductility. Thus, the annealing temperature is limited to 900° C. or below. Preferably, the annealing temperature is 880° C. or below.

Cooling in a Range of Temperatures from 810° C. to 500° C. at an Average Cooling Rate (CR1) of 5 to 100° C./s After the steel sheet is held at 810 to 900° C., the steel sheet is cooled in a range of temperatures from 810° C. to 500° C. at an average cooling rate (CR1) of 5 to 100° C./s. When the average cooling rate (CR1) is lower than 5° C./s, a large amount of ferrite is formed to cause a decrease in strength and a decrease in stretch flange formability. The average cooling rate (CR1) is preferably 8° C./s or more. When, on the other hand, the average cooling rate (CR1) is too high, the sheet shape is deteriorated. Thus, the average cooling rate is limited to 100° C./s or less. The average cooling rate (CR1) is preferably 50° C./s or less, and more preferably less than 30° C./s.

Here, the average cooling rate (CR1) is "(810° C. (cooling start temperature)−500° C. (finish cooling temperature))/(cooling time (seconds) from cooling start temperature 810° C. to finish cooling temperature 500° C.)".

Residence in a Range of Temperatures from 500° C. to a Residence Finish Temperature (T1) that is Equal to or Higher than a Martensite Start Temperature Ms (° C.) and is Equal to or Higher than 320° C. for 10 Seconds or More and 60 Seconds or Less while Performing Cooling at an Average Cooling Rate (CR2) of 10° C./s or Less The steel sheet is caused to reside (is gradually cooled) in a range of temperatures from 500° C. to a residence finish temperature (T1) that is equal to or higher than a martensite start temperature Ms (° C.) and is equal to or higher than 320° C. for 10 seconds or more and 60 seconds or less while being cooled at an average cooling rate (CR2) of 10° C./s or less. In this manner, bainite having a low carbide density can be formed, and retained γ having a high C concentration can be formed adjacent thereto. When the temperature range is below the Ms or below 320° C., martensite transformation precedes and lower bainite is formed, thus causing a decrease in strength. When, on the other hand, the temperature range exceeds 500° C., the driving force for bainite transformation decreases and the amount of bainite transformation is reduced. Thus, the temperature range is limited to be 500° C. or below and to be equal to or higher than the Ms and equal to or higher than 320° C. This temperature range is preferably 380° C. or above, and more preferably 420° C. or above. The temperature range is preferably 480° C. or below, and more preferably 460° C. or below. When the average cooling rate (CR2) exceeds 10° C./s, the amount of bainite transformation is reduced. Thus, the average cooling rate (CR2) is limited to 10° C./s or less. When the residence time is less than 10 seconds, the desired amount of bainite cannot be obtained. When the residence time exceeds 60 seconds, the enrichment of carbon from bainite to massive non-transformed γ proceeds to result in an increase in the residual amount of the massive microstructure. Thus, the residence time is limited to 10 seconds or more and 60 seconds or less. In order to ensure bainitic ferrite and retained austenite and to enhance ductility and HAZ softening resistance, the residence time is preferably 20 seconds or more. In order to reduce the formation of massive microstructures and thereby to enhance stretch flange formability, the residence time is preferably 50 seconds or less.

The martensite start temperature Ms can be determined using a Formaster tester by holding a cylindrical test piece (3 mm in diameter×10 mm in height) at a predetermined annealing temperature and quenching the test piece with helium gas while measuring the volume change.

Here, the average cooling rate (CR2) is "(500° C. (residence start temperature)−residence finish temperature (T1))/(residence time (seconds) from 500° C. to residence finish temperature (T1))".

Cooling in a Range of Temperatures from the Residence Finish Temperature (T1) to a Finish Cooling Temperature (T2) of 200° C. or Above and 300° C. or Below at an Average Cooling Rate (CR3) of 3 to 100° C./s After the above residence, the steel sheet needs to be cooled rapidly to avoid excessive progress of carbon enrichment into γ. When the average cooling rate (CR3) in the range of temperatures from the residence finish temperature T1 of 320° C. or above to the finish cooling temperature T2 of 200° C. or above and 300° C. or below is less than 3° C./s, carbon is concentrated into massive non-transformed γ and an increased amount of fresh martensite is formed during the final cooling to cause a decrease in stretch flange formability. From the point of view of enhancing stretch flange formability, the average cooling rate (CR3) in the range of temperatures from the residence finish temperature T1 to the finish cooling temperature T2 of 200° C. or above and 300° C. or below is limited to 3° C./s or more. The average cooling rate (CR3) is more preferably 5° C./s or more, and still more preferably 8° C./s or more. When the average cooling rate in the above temperature range is excessively high, the sheet shape is deteriorated. Thus, the average cooling rate (CR3) in the above temperature range is limited to 100° C./s or less. The average cooling rate (CR3) is preferably 50° C./s or less. In order to ensure a predetermined amount of retained γ, the finish cooling temperature T2 is limited to 200° C. or above. The finish cooling temperature T2 is preferably 220° C. or above, and more preferably 240° C. or above. When the finish cooling temperature T2 is above 300° C., a large amount of massive non-transformed γ remains and an increased amount of fresh martensite is formed during the final cooling to cause a decrease in stretch flange formability. Thus, the finish cooling temperature T2 is limited to 300° C. or below. The finish cooling temperature T2 is preferably 280° C. or below.

Here, the average cooling rate (CR3) is "(residence finish temperature (T1))−(finish cooling temperature (T2))/(cooling time (seconds) from residence finish temperature (T1) to finish cooling temperature (T2))".

Heating in a Range of Temperatures from the Finish Cooling Temperature (T2) to 380° C. at an Average Heating Rate of 2° C./s or More Furthermore, the steel sheet is heated in a range of temperatures from the finish cooling temperature (T2) to 380° C. in a short time. In this manner, the precipitation of carbides is suppressed and high ductility can be ensured. When the steel sheet is reheated to 380° C. or above, upper bainite is formed from martensite or bainite as nucleus that has been formed during cooling. When the average heating rate during heating to 380° C. is low, the above effects cannot be obtained. As a result, the amount of retained γ is reduced and ductility is lowered. Thus, the average heating rate in the range of temperatures from the finish cooling temperature (T2) to 380° C. is limited to 2° C./s or more. From the points of view of suppressing carbide precipitation and forming upper bainite at the time of reheating, the average heating rate is preferably 5° C./s or more, and more preferably 10° C./s or more. The upper limit of the average heating rate is not particularly limited but is preferably 50° C./s or less, and more preferably 30° C./s or less.

Here, the average heating rate is "380° C. (heating stop temperature)−(finish cooling temperature (T2))/(heating time (seconds) from finish cooling temperature T2 to 380° C. (heating stop temperature))".

Residence in a Range of Temperatures of 340° C. or Above and 590° C. or Below for 20 Seconds or More and 3000 Seconds or Less while Performing Cooling at an Average Cooling Rate (CR4) of 0.01 to 5° C./s In order to partition carbon to retained γ and stabilize the retained γ and in order to divide massive regions distributed as non-transformed γ by bainite transformation and thereby to enhance stretch flange formability, the steel sheet is caused to reside (is gradually cooled) in a range of temperatures of 340° C. or above and 590° C. or below for 20 seconds or more and 3000 seconds or less. Furthermore, in order to enhance stretch flange formability by eliminating or reducing the formation of massive microstructures due to excessive partitioning of carbon to retained γ and also by causing self-tempering of fresh martensite, the steel sheet is cooled slowly in this temperature range at an average cooling rate (CR4) of 0.01 to 5° C./s. When the average cooling rate (CR4) is less than 0.01° C./s, carbon is excessively partitioned to retained γ and massive microstructures are formed to cause a decrease in stretch flange formability. Thus, the average cooling rate (CR4) is limited to 0.01° C./s or more. When, on the other hand, the average cooling rate (CR4) exceeds 5° C./s, the partitioning of carbon to retained γ is suppressed and a sufficient amount of carbon-enriched regions cannot be obtained. Furthermore, fresh martensite is formed to cause a decrease in λ. Thus, the average cooling rate (CR4) is limited to 5° C./s or less.

Here, the average cooling rate (CR4) is "(cooling start temperature (T3))−(finish cooling temperature (T4))/(cooling time (seconds) from cooling start temperature (T3) to finish cooling temperature (T4))".

Here, the cooling start temperature (T3) and the finish cooling temperature (T4) are not particularly limited as long as they are in the range of 340° C. or above and 590° C. or below. The cooling start temperature (T3) is preferably in the range of 360 to 580° C. The finish cooling temperature (T4) is preferably in the range of 350 to 450° C.

The holding (residence) in the temperature range of 340 to 590° C. may also include a hot-dip galvanizing treatment. That is, the steel sheet may be subjected to a hot-dip galvanizing treatment or a hot-dip galvannealing treatment in the step where the steel sheet is caused to reside while being cooled at an average cooling rate (CR4) of 0.01 to 5° C./s. When a hot-dip galvanizing treatment is performed, the steel sheet is hot-dip galvanized by being immersed into a galvanizing bath at 440° C. or above and 500° C. or below, and the coating weight is preferably adjusted by, for example, gas wiping. The galvanizing bath used in the hot-dip galvanization preferably has an Al content of 0.10% or more and 0.22% or less. Furthermore, a hot-dip galvannealing treatment may be performed by an alloying treatment of the zinc coating after the hot-dip galvanizing treatment. The alloying treatment of the zinc coating is preferably performed in a temperature range of 470° C. or above and 590° C. or below. Although this step is a cooling step (residence and slow cooling), the hot-dip galvanizing treatment and the alloying treatment of the zinc coating may be performed during the step as long as the temperature range, the residence time, and the average cooling rate CR4 described above are satisfied. The hot-dip galvanizing treatment and the alloying treatment of the zinc coating may involve a temperature rise.

Cooling to a Temperature of 50° C. or Below at an Average Cooling Rate (CR5) of 0.1° C./s or More In order to prevent softening due to excessive tempering and to avoid a decrease in ductility due to carbide precipitation, the steel sheet is then cooled to a temperature of 50° C. or below at an average cooling rate (CR5) of 0.1° C./s or more. In order to stabilize press formability, for example, to control surface roughness and to flatten the sheet shape, and also in order to increase the YS, the steel sheet may be subjected to skin pass rolling. The skin pass rolling reduction ratio is preferably 0.1 to 0.5%. The sheet shape may be flattened with a leveler. The average cooling rate (CR5) to a temperature of 50° C. or below is preferably 5° C./s or more, and more preferably 100° C./s or less.

Here, the average cooling rate (CR5) is "(340° C. (cooling start temperature)−finish cooling temperature of 50° C. or below)/(cooling time (seconds) from cooling start temperature to finish cooling temperature)".

In order to improve stretch flange formability, the above heat treatment or the skin pass rolling may be followed by a low-temperature heat treatment at 100 to 300° C. for 30 seconds to 10 days. This treatment tempers martensite that has been formed during the final cooling or the skin pass rolling and detaches from the steel sheet hydrogen that has penetrated into the steel sheet during annealing. By the low-temperature heat treatment, hydrogen can be reduced to less than 0.1 ppm. Furthermore, electroplating may be performed. That is, the steel sheet may be electrogalvanized after the step where the steel sheet is cooled at an average cooling rate (CR5) of 0.1° C./s or more. The electrogalvanization is preferably followed by the above low-temperature heat treatment in order to reduce the amount of hydrogen in the steel.

The steel sheet according to aspects of the present invention preferably has a thickness of 0.5 mm or more. The thickness is preferably 2.0 mm or less.

Next, a member and a method for manufacture thereof according to aspects of the present invention will be described.

The member according to aspects of the present invention is obtained by subjecting the steel sheet according to aspects of the present invention to at least one working of forming and joining. The method for manufacturing a member according to aspects of the present invention includes a step of subjecting the steel sheet according to aspects of the present invention to at least one working of forming and joining to produce a member.

The steel sheet according to aspects of the present invention has a tensile strength of 980 MPa or more and is excellent in ductility, stretch flange formability, and laser weldability. Thus, the member that is obtained using the steel sheet according to aspects of the present invention also has high strength and has excellent ductility, excellent stretch flange formability, and excellent laser weldability compared to the conventional high-strength members. Furthermore, weight can be reduced by using the member according to aspects of the present invention. Thus, for example, the member according to aspects of the present invention may be suitably used in an automobile body frame part. The member according to aspects of the present invention also includes a welded joint.

The forming may be performed using any common working process, such as press working, without limitation. Furthermore, the joining may be performed using common welding, such as spot welding or arc welding, or, for example, riveting or crimping without limitation.

EXAMPLES

EXAMPLES of the present invention will be described below.

Steel sheets according to aspects of the present invention and steel sheets of COMPARATIVE EXAMPLES were manufactured by treating 1.4 mm thick cold rolled steel sheets having a chemical composition described in Table 1 under annealing conditions described in Table 2.

The cold rolled steel sheets had been obtained by subjecting steel slabs having the chemical composition described in Table 1 to hot rolling (slab heating temperature: 1200° C., soaking time: 60 minutes, finish rolling temperature: 900° C., coiling temperature: 500° C.) and cold rolling (rolling reduction ratio (cumulative rolling reduction ratio): 50%).

In Table 2, the martensite start temperature Ms was obtained using a Formaster tester by holding a cylindrical test piece (3 mm in diameter×10 mm in height) at a predetermined annealing temperature and quenching the test piece with helium gas while measuring the volume change.

Some of the steel sheets (cold rolled steel sheets: CR) were obtained as hot-dip galvanized steel sheets (GI) by being hot-dip galvanized in a step where the steel sheet was caused to reside in a range of temperatures of 340° C. or above and 590° C. or below for 20 seconds or more and 3000 seconds or less while being cooled at an average cooling rate of 0.01 to 5° C./s. Here, the steel sheets were hot-dip galvanized by being immersed into a galvanizing bath at a temperature of 440° C. or above and 500° C. or below, and the coating weight was adjusted by, for example, gas wiping. The galvanizing bath used in the hot-dip galvanization had an Al content of 0.10% or more and 0.22% or less. Furthermore, some of the hot-dip galvanized steel sheets were alloyed and obtained as hot-dip galvannealed steel sheets (GA) by being subjected to an alloying treatment after the hot-dip galvanizing treatment. Here, the alloying treatment was performed in a range of temperatures of 460° C. or above and 590° C. or below. Furthermore, some of the steel sheets (cold rolled steel sheets: CR) were obtained as electrogalvanized steel sheets (EG) by electroplating.

The steel microstructure was measured in the following manner. The measurement results are described in Table 3. To measure the area fractions of polygonal ferrite, bainitic ferrite, tempered martensite, and fresh martensite, the steel sheet was cut to expose a through-thickness cross section that was parallel to the rolling direction. The cross section was mirror-polished and was etched with 3 vol % Nital. Portions at ¼ thickness were observed with SEM in 10 fields of view at a magnification of 5000 times. As illustrated in FIG. 2, the polygonal ferrite discussed here is relatively equiaxed ferrite containing almost no internal carbides. This region looks blackest in SEM. Bainitic ferrite is a ferrite microstructure that contains carbide or retained γ which looks white in SEM.

When determination was difficult whether the ferrite was bainitic ferrite or polygonal ferrite, the area fractions were calculated while assuming that the region was polygonal ferrite when the aspect ratio was ≤2.0 and the region was bainitic ferrite when the aspect ratio was >2.0.

As illustrated in FIG. 3(A), the aspect ratio was obtained from a/b in which a was the major axis length where the particle length was longest, and b was the minor axis length that cut across the particle over the largest length perpendicular to the major axis length. When particles were in contact with one another, as illustrated in FIG. 3(B), the particles were divided at a position that divided the particles approximately evenly and the sizes of the respective particles were measured.

The number of internal carbides in bainitic ferrite per 10 $\mu m^2$ was determined by measuring the area of bainitic ferrite and counting the number of internal carbides in a ×5000 SEM image, dividing the carbide count by the area of bainitic ferrite, and converting the quotient into the value per 10 $\mu m^2$.

Tempered martensite is a region that contains a lath-like submicrostructure and carbide precipitates according to SEM. Fresh martensite is a massive region that looks white and does not contain any visible submicrostructures according to SEM.

The microstructure including one, or two or more of tempered martensite, fresh martensite, upper bainite, lower bainite, and retained austenite corresponds to the remaining microstructure after the polygonal ferrite, and the total area fraction of this microstructure is the area fraction of the regions other than the polygonal ferrite. Here, the area fraction of carbides was very small and was thus included in the above area fraction of the remaining microstructure.

The volume fraction of retained austenite (retained γ) was determined by chemically polishing the steel sheet surface to a location at ¼ thickness and analyzing the sheet surface by X-ray diffractometry. Co-Kα radiation source was used as the incident X-ray, and the volume fraction of retained austenite was calculated from the intensity ratio of (200), (211), and (220) planes of ferrite and (200), (220), and (311) planes of austenite. Because retained γ is randomly distributed, the volume fraction of retained γ obtained by X-ray diffractometry is equal to the area fraction of retained γ in the steel microstructure.

The number density of retained austenite present adjacent to bainitic ferrite having 20 or less internal carbides per 10 $\mu m^2$ was determined as follows. The sample used for bainitic ferrite observation was mirror-polished. An electron backscattering diffraction pattern (EBSD) of the same field of view as obtained in SEM was subjected to mapping measurement using EBSD analysis program OIM Data Collection ver. 7. The obtained data was analyzed using TSL OIM Analysis ver. 7 (manufactured by EDAX/TSL) to give phase map data. The number density of fcc structures present adjacent to bainitic ferrite having 20 or less internal carbides per 10 $\mu m^2$ was measured. Here, the term "adjacent" means that the fcc structures were in contact with bcc structures corresponding to bainitic ferrite having 20 or less internal carbides per 10 $\mu m^2$ in the phase map. The fcc structure may be included in the bcc structure.

The area $S_{C\geq 0.5}$ of a region having a C concentration of 0.50% (mass %) or more and the area $S_{C\geq 0.3}$ of a region having a C concentration of 0.30% (mass %) or more were measured by mapping analysis of the C concentration distribution with respect to positions at ¼ thickness of a through-thickness cross section perpendicular to the steel sheet surface and parallel to the rolling direction, using field emission electron probe microanalyzer (FE-EPMA) JXA-8500F manufactured by JEOL Ltd., at an acceleration voltage of 6 kV and an illumination current of $7\times10^{-8}$ A with the minimum beam diameter.

In order to eliminate the influence of contamination, the background was subtracted so that the average value of carbon obtained by the analysis would be equal to the amount of carbon in the base material. Specifically, when the average of the measured amounts of carbon was greater than the amount of carbon in the base material, the excess was understood as contamination, and the excess was subtracted from each of the values analyzed at the respective positions. The values thus obtained were taken as the true amounts of carbon at the respective positions.

JIS No. 5 test pieces for tensile test and test pieces for hole expansion test were sampled from the steel sheets obtained. A tensile test was performed (in accordance with JIS Z2241). The tensile strength TS and the total elongation T-El are described in Table 3. The steel sheets were evaluated as being excellent in strength when the tensile strength was 980 MPa or more. Furthermore, the ductility was evaluated as excellent when the total elongation T-El was 16.0% or more for the steel sheets having a TS of less than 1180 MPa, when the total elongation T-El was 14.0% or more for the steel sheets having a TS of 1180 MPa or more and less than 1320 MPa, and when the total elongation T-El was 13.0% or more for the steel sheets having a TS of 1320 MPa or more.

Furthermore, the test pieces for hole expansion test sampled from the steel sheets after the heat treatment were subjected to a hole expansion test conforming to the provisions of The Japan Iron and Steel Federation Standard JFST 1001 to evaluate stretch flange formability.

Specifically, a 100 mm×100 mm square sample was punched with a punching tool having a punch diameter of 10 mm and a die diameter of 10.3 mm (13% clearance), and a conical punch having an apex angle of 60 degrees was inserted into the hole in such a manner that the burr produced at the time of punching would be directed to the outside. The hole was expanded until the sheet was cracked through the thickness. The hole expansion ratio $\lambda$ (%)=$\{(d-d_0)/d_0\}\times 100$ was calculated. Here, $d_0$: initial hole diameter (mm), and d: hole diameter (mm) at the occurrence of cracking. The results are described in Table 3. The steel was evaluated as having excellent flangeability when A was 30% or more.

Furthermore, two steel sheet workpieces each 120 mm in the direction perpendicular to the rolling direction and 200 mm in the rolling direction were sampled from the steel sheet (the end faces were ground). The two workpieces were butted against each other so that their rolling directions were aligned. The butt position was laser welded. The gap between the butted faces was 0 mm. The laser welding was performed using Nd-YAG laser. The spot diameter at the focus position was 0.6 mm. The focus position was 4 mm above the steel sheet. The shield gas was Ar. The laser output was 4.2 kW. The welding speed was 3.7 m/min. A test piece for tensile test having a shape described in FIG. 1(*a*) was sampled from the welded member in such a manner that the weld line would be perpendicular to the tensile axis and would be located at the longitudinal center of the test piece. The test piece was subjected to a tensile test to determine the fracture mode (fracture mode determination test). When the fracture position was 2.0 mm or more away from the weld line (when even a part of the fracture position was 2.0 mm or more away from the weld line), the fracture mode was determined to be the base material fracture. When the fracture position was less than 2.0 mm away from the weld line and the test piece had been fractured by the extension of a crack along the weld line (the extension of a crack in the HAZ or the fused portion), the fracture mode was determined to be the weld fracture. Furthermore, a test piece was sampled from the welded member in such a manner that the weld line would be perpendicular to the tensile axis and would be located at the longitudinal center of the test piece, and the weld was notched as illustrated in FIG. 1(*b*). The notched test piece was subjected to a tensile test (a notched tensile test). In the manner described above, the test pieces were deformed exclusively at the HAZ of the weld and limited regions around the HAZ and were forcibly fractured at the HAZ portion to evaluate the strength of the HAZ portion itself. Thus, more quantitative grasp of the quality of laser weldability was realized. In the evaluation, the laser weldability (the HAZ softening resistance) was evaluated as being excellent when the test piece was fractured in the base material fracture mode in the fracture mode determination test and satisfied HAZ strength≥base material TS+50 MPa in the notched tensile test.

INVENTIVE EXAMPLES described in Tables 2 and 3 attained excellent strength, ductility, flangeability, and laser weldability (HAZ softening resistance). In contrast, COMPARATIVE EXAMPLES were unsatisfactory in one or more of these properties.

TABLE 1

| | Chemical composition (mass %) | | | | | | | | |
|---|---|---|---|---|---|---|---|---|---|
| Steel | C | Si | Mn | P | S | sol. Al | N | others | Remarks |
| A | 0.125 | 0.63 | 3.04 | 0.004 | 0.0005 | 0.043 | 0.0030 | — | Compliant steel |
| B | 0.264 | 1.17 | 2.32 | 0.009 | 0.0010 | 0.017 | 0.0071 | — | Comparative steel |
| C | 0.113 | 1.24 | 2.62 | 0.001 | 0.0010 | 0.029 | 0.0042 | Ti: 0.027, B: 0.0031 | Compliant steel |
| D | 0.134 | 0.34 | 2.43 | 0.004 | 0.0005 | 10.032 | 0.0024 | — | Comparative steel |
| E | 0.198 | 1.79 | 2.51 | 0.003 | 0.0006 | 0.039 | 0.0056 | Ti: 0.018, B: 0.0054, Nb: 0.030 | Compliant steel |
| F | 0.201 | 1.68 | 1.42 | 0.002 | 0.0010 | 0.031 | 0.0030 | — | Comparative steel |
| G | 0.241 | 2.32 | 1.58 | 0.002 | 0.0018 | 0.039 | 0.0012 | Ti: 0.042, B: 0.0028, Cu: 0.18, Ni: 0.06, Cr: 0.06, Mo: 0.06 | Compliant steel |
| H | 0.177 | 1.61 | 2.93 | 0.003 | 0.0012 | 0.009 | 0.0056 | V: 0.013, Zr: 0.010, W: 0.011 | Compliant steel |
| I | 0.048 | 1.37 | 2.64 | 0.005 | 0.0005 | 0.006 | 0.0053 | — | Comparative steel |
| J | 0.186 | 0.62 | 3.30 | 0.010 | 0.0006 | 0.005 | 0.0078 | Ti: 0.021, B: 0.0050, Ca: 0.0012, Ce: 0.0007, La: 0.0020 | Compliant steel |
| K | 0.208 | 1.95 | 2.71 | 0.001 | 0.0004 | 0.006 | 0.0067 | B: 0.0016, Mg: 0.0010, Sb: 0.01, Sn: 0.01 | Compliant steel |

TABLE 1-continued

| | Chemical composition (mass %) | | | | | | | | |
|---|---|---|---|---|---|---|---|---|---|
| Steel | C | Si | Mn | P | S | sol. Al | N | others | Remarks |
| L | 0.164 | 2.59 | 3.41 | 0.007 | 0.0006 | 0.040 | 0.0056 | — | Comparative steel |
| M | 0.181 | 2.43 | 3.61 | 0.006 | 0.0005 | 0.021 | 0.0063 | — | Comparative steel |

*Underlines indicate being outside of the range of the present invention.
*The balance after the above components is Fe and incidental impurities.

TABLE 2

| | | Annealing conditions | | | | | | | | |
|---|---|---|---|---|---|---|---|---|---|---|
| No. | Steel | Annealing temp. (° C.) | CR1*1 (° C./s) | Ms(° C.) | CR2*2 (° C./s) | Residence time*3 (sec) | Residence finish temp. T1 (° C.) | CR3*4 (° C./s) | Finish cooling temp. T2 (° C.) | Heating rate*5 (° C./s) |
| 1 | A | 820 | 30 | 330 | 1 | 40 | 460 | 3 | 220 | 2 |
| 2 | A | 875 | 20 | 355 | 1 | 60 | 440 | 5 | 280 | 5 |
| 3 | A | 800 | 30 | 310 | 1 | 60 | 440 | 5 | 250 | 5 |
| 4 | A | 910 | 30 | 355 | 1 | 60 | 440 | 5 | 250 | 5 |
| 5 | B | 830 | 30 | 330 | 1 | 60 | 440 | 5 | 260 | 5 |
| 6 | C | 845 | 6 | 370 | 3 | 10 | 470 | 8 | 260 | 10 |
| 7 | C | 815 | 10 | 345 | 3 | 20 | 440 | 10 | 205 | 10 |
| 8 | C | 830 | 3 | 330 | 3 | 20 | 440 | 10 | 260 | 10 |
| 9 | C | 830 | 10 | 340 | 15 | 10 | 350 | 10 | 260 | 10 |
| 10 | D | 830 | 10 | 375 | 3 | 20 | 440 | 10 | 220 | 10 |
| 11 | E | 830 | 20 | 375 | 3 | 30 | 410 | 10 | 250 | 10 |
| 12 | F | 860 | 20 | 375 | 3 | 30 | 410 | 10 | 295 | 20 |
| 13 | E | 860 | 20 | 375 | 3 | 8 | 476 | 10 | 220 | 20 |
| 14 | E | 800 | 20 | 330 | 2 | 80 | 340 | 10 | 280 | 20 |
| 15 | F | 820 | 20 | 345 | 3 | 50 | 350 | 10 | 280 | 20 |
| 16 | G | 810 | 20 | 330 | 3 | 50 | 350 | 10 | 230 | 20 |
| 17 | G | 840 | 20 | 345 | 3 | 50 | 350 | 10 | 260 | 20 |
| 18 | G | 840 | 20 | 345 | 3 | 50 | 350 | 1 | 280 | 20 |
| 19 | G | 840 | 20 | 345 | 3 | 50 | 350 | 10 | 190 | 20 |
| 20 | H | 890 | 50 | 335 | 5 | 10 | 450 | 10 | 280 | 20 |
| 21 | H | 890 | 50 | 335 | 5 | 30 | 350 | 20 | 280 | 20 |
| 22 | H | 840 | 50 | 330 | 5 | 30 | 350 | 20 | 310 | 20 |
| 23 | H | 840 | 50 | 330 | 5 | 30 | 350 | 20 | 290 | 1 |
| 24 | I | 850 | 50 | 380 | 3 | 30 | 410 | 20 | 250 | 20 |
| 25 | J | 850 | 60 | 325 | 5 | 30 | 350 | 30 | 260 | 20 |
| 26 | J | 850 | 60 | 325 | 5 | 30 | 350 | 30 | 260 | 20 |
| 27 | J | 815 | 60 | 315 | 5 | 30 | 350 | 30 | 280 | 20 |
| 28 | J | 850 | 60 | 325 | 5 | 30 | 350 | 30 | 220 | 20 |
| 29 | K | 810 | 80 | 310 | 10 | 10 | 400 | 50 | 210 | 20 |
| 30 | K | 810 | 95 | 310 | 10 | 18 | 320 | 80 | 240 | 20 |
| 31 | K | 860 | 95 | 325 | 10 | 10 | 400 | 80 | 230 | 20 |
| 32 | K | 830 | 95 | 325 | 10 | 10 | 400 | 80 | 280 | 20 |
| 33 | L | 830 | 95 | 300 | 10 | 10 | 400 | 80 | 290 | 20 |
| 34 | M | 840 | 95 | 300 | 10 | 10 | 400 | 80 | 290 | 20 |

| | | Annealing conditions | | | | | | |
|---|---|---|---|---|---|---|---|---|
| No. | Steel | CR4*6 (° C./s) | Residence time *7 (sec) | Cooling start temp. T3 (° C.) | Finish cooling temp. T4 (° C.) | CR5*8 (° C./s) | Plating*9 | Remarks |
| 1 | A | 0.01 | 2800 | 380 | 352 | 5 | CR | INV. EX. |
| 2 | A | 0.03 | 1500 | 420 | 375 | 5 | CR | INV. EX. |
| 3 | A | 0.03 | 1500 | 420 | 375 | 5 | CR | COMP EX. |
| 4 | A | 0.03 | 1500 | 420 | 375 | 5 | CR | COMP. EX. |
| 5 | B | 0.03 | 1500 | 420 | 375 | 5 | CR | COMP. EX. |
| 6 | C | 0.03 | 500 | 400 | 385 | 5 | CR | INV. EX. |
| 7 | C | 0.03 | 500 | 400 | 385 | 5 | CR | INV. EX. |
| 8 | C | 0.03 | 500 | 400 | 385 | 5 | CR | COMP. EX. |

TABLE 2-continued

| | | | | | | | | |
|---|---|---|---|---|---|---|---|---|
| 9 | C | 0.03 | 500 | 400 | 385 | 5 | CR | COMP. EX. |
| 10 | D | 0.03 | 500 | 400 | 385 | 5 | CR | COMP EX. |
| 11 | E | 0.05 | 700 | 450 | 415 | 5 | CR | INV. EX. |
| 12 | F | 0.05 | 700 | 450 | 415 | 5 | CR | INV. EX. |
| 13 | E | 0.05 | 700 | 450 | 415 | 5 | CR | COMP EX. |
| 14 | E | 0.05 | 700 | 450 | 415 | 5 | CR | COMP EX. |
| 15 | F | 0.05 | 700 | 450 | 415 | 5 | CR | COMP. EX. |
| 16 | G | 0.07 | 900 | 550 | 487 | 5 | GA | INV. EX. |
| 17 | G | 0.07 | 900 | 550 | 487 | 5 | GA | INV. EX. |
| 18 | G | 0.07 | 900 | 550 | 487 | 5 | GA | COMP EX. |
| 19 | G | 0.07 | 900 | 550 | 487 | 5 | GA | COMP. EX. |
| 20 | H | 0.20 | 600 | 500 | 380 | 80 | GI | INV. EX. |
| 21 | H | 0.20 | 600 | 500 | 380 | 10 | GI | INV. EX. |
| 22 | H | 0.20 | 600 | 500 | 380 | 10 | GI | COMP. EX. |
| 23 | H | 0.20 | 600 | 500 | 380 | 10 | GI | COMP. EX. |
| 24 | I | 0.20 | 600 | 500 | 380 | 10 | GI | COMP. EX. |
| 25 | C | 0.80 | 300 | 585 | 345 | 10 | EG | INV. EX. |
| 26 | J | 0.80 | 300 | 585 | 345 | 10 | EG | INV. EX. |
| 27 | J | 0.00 | 100 | 350 | 350 | 10 | EG | COMP. EX. |
| 28 | J | 10 | 30 | 480 | 180 | 10 | EG | COMP. EX. |
| 29 | K | 1.50 | 100 | 500 | 350 | 1 | CR | INV. EX. |
| 30 | K | 3.00 | 50 | 500 | 350 | 1 | CR | INV. EX. |
| 31 | K | 4.00 | 10 | 430 | 390 | 1 | EG | COMP. EX. |
| 32 | K | 0.01 | 3200 | 390 | 358 | 1 | EG | COMP. EX |
| 33 | L | 0.07 | 900 | 440 | 377 | 1 | EG | COMP. EX. |
| 34 | M | 0.07 | 1000 | 440 | 370 | 1 | EG | COMP. EX. |

*Underlines indicate being outside of the range of the present invention.
*1Average cooling rate CR1 in range of temperatures from 810 to 500° C.
*2Average cooling rate CR2 in range of temperatures from 500° C. to residence finish temperature T1
*3Residence time in range of temperatures from 500° C. to residence finish temperature T1
*4Average cooling rate CR3 in range of temperatures from residence finish temperature T1 to finish cooling temperature T2
*5Average heating rate in range of temperatures from finish cooling temperature T2 to 380° C.
*6Average cooling rate CR4 in range of temperatures of 340° C. or above and 590° C. or below
*7 Residence time in range of temperatures of 340° C. or above and 590° C. or below
*8Average cooling rate CR5 to temperature of 50° C. or below
*9CR: no plating, GA: hot-dip galvannealed steel sheet, GI: hot-dip galvanized steel sheet (no alloying treatment of zinc coating), EG: electrogalvanized steel sheet

TABLE 3

| | | Microstructure | | | | | | |
|---|---|---|---|---|---|---|---|---|
| No. | Steel | Polygonal ferrite area fraction (%) | Tempered martensite area fraction (%) | Fresh martensite area fraction (%) | BF*10 area fraction (%) | $\gamma_{BF}$*11 number density (precipitates/ 10000 $\mu m^2$) | Remaining micro-structure*12 area fraction (%) | Retained γ volume fraction (%) |
| 1 | A | 9 | 41 | 8 | 34 | 230 | 91 | 8 |
| 2 | A | 0 | 55 | 6 | 30 | 202 | 100 | 9 |
| 3 | A | 13 | 43 | 22 | 16 | 148 | 87 | 6 |
| 4 | A | 0 | 59 | 3 | 31 | 205 | 100 | 7 |
| 5 | B | 1 | 63 | 18 | 8 | 213 | 99 | 10 |
| 6 | C | 4 | 66 | 7 | 15 | 174 | 96 | 8 |
| 7 | C | 8 | 67 | 8 | 7 | 142 | 92 | 10 |
| 8 | C | 12 | 54 | 15 | 11 | 153 | 88 | 8 |
| 9 | C | 5 | 75 | 9 | 2 | 83 | 95 | 9 |
| 10 | D | 4 | 73 | 6 | 13 | 52 | 96 | 4 |
| 11 | E | 1 | 74 | 5 | 6 | 130 | 99 | 12 |
| 12 | E | 0 | 72 | 13 | 9 | 148 | 100 | 6 |
| 13 | E | 1 | 87 | 3 | 2 | 66 | 99 | 7 |
| 14 | E | 5 | 24 | 24 | 41 | 242 | 95 | 6 |

TABLE 3-continued

| | | | | | | | | |
|---|---|---|---|---|---|---|---|---|
| 15 | F | 15 | 56 | 17 | 8 | 163 | 85 | 4 |
| 16 | G | 3 | 74 | 4 | 5 | 147 | 97 | 14 |
| 17 | G | 2 | 67 | 6 | 8 | 137 | 98 | 12 |
| 18 | G | 2 | 26 | 21 | 43 | 235 | 98 | 8 |
| 19 | G | 1 | 78 | 3 | 15 | 188 | 99 | 3 |
| 20 | H | 0 | 72 | 11 | 6 | 72 | 100 | 11 |
| 21 | H | 0 | 69 | 9 | 12 | 122 | 100 | 10 |
| 22 | H | 1 | 63 | 23 | 11 | 135 | 99 | 2 |
| 23 | H | 2 | 74 | 17 | 4 | 140 | 98 | 3 |
| 24 | I | 45 | 34 | 5 | 15 | 32 | 55 | 1 |
| 25 | J | 1 | 68 | 7 | 13 | 150 | 99 | 11 |
| 26 | J | 0 | 61 | 7 | 15 | 161 | 100 | 12 |
| 27 | J | 8 | 51 | 22 | 9 | 243 | 92 | 10 |
| 28 | J | 0 | 80 | 4 | 10 | 55 | 100 | 6 |
| 29 | K | 8 | 66 | 4 | 4 | 48 | 92 | 18 |
| 30 | K | 7 | 58 | 8 | 7 | 63 | 93 | 15 |
| 31 | K | 0 | 81 | 3 | 12 | 45 | 100 | 4 |
| 32 | K | 4 | 41 | 11 | 41 | 174 | 96 | 3 |
| 33 | L | 2 | 62 | 23 | 2 | 163 | 98 | 11 |
| 34 | M | 1 | 62 | 22 | 3 | 163 | 99 | 12 |

| | | | Characteristics | | | | | |
|---|---|---|---|---|---|---|---|---|
| No. | Steel | Microstructure $S_{C\geq0.5}/S_{C\geq0.3}$(%) | TS (MPa) | T-El (%) | λ (%) | Fracture position | HAZ strength (MPa) | Remarks |
| 1 | A | 41 | 991 | 18.8 | 53 | Base material | 1052 | INV. EX. |
| 2 | A | 40 | 1003 | 18.1 | 55 | Base material | 1067 | INV. EX. |
| 3 | A | 38 | 975 | 18.4 | 28 | HAZ | 1010 | COMP. EX. |
| 4 | A | 18 | 1108 | 15.8 | 64 | Base material | 1166 | COMP. EX. |
| 5 | B | 48 | 1421 | 5.3 | 26 | Base material | 1482 | COMP. EX. |
| 6 | C | 37 | 1067 | 17.5 | 65 | Base material | 1132 | INV. EX. |
| 7 | C | 39 | 1082 | 16.7 | 62 | Base material | 1141 | INV. EX. |
| 8 | C | 32 | 968 | 19.3 | 45 | Base material | 1031 | COMP. EX. |
| 9 | C | 17 | 1056 | 15.6 | 53 | Base material | 1102 | COMP. EX. |
| 10 | D | 21 | 1069 | 15.1 | 56 | Base material | 1126 | COMP. EX. |
| 11 | E | 36 | 1201 | 17.2 | 51 | Base material | 1256 | INV. EX. |
| 12 | E | 22 | 1268 | 15.3 | 47 | Base material | 1330 | INV. EX. |
| 13 | E | 18 | 1287 | 13.7 | 62 | Base material | 1335 | COMP. EX. |
| 14 | E | 40 | 1183 | 16.5 | 27 | HAZ | 1221 | COMP. EX. |
| 15 | F | 24 | 1154 | 13.6 | 32 | Base material | 1210 | COMP. EX. |
| 16 | G | 39 | 1333 | 14.7 | 58 | Base material | 1394 | INV. EX. |
| 17 | G | 36 | 1350 | 14.2 | 57 | Base material | 1407 | INV. EX. |
| 18 | G | 38 | 1325 | 15.1 | 24 | HAZ | 1361 | COMP. EX. |
| 19 | G | 35 | 1407 | 12.8 | 42 | Base material | 1463 | COMP. EX. |
| 20 | H | 31 | 1258 | 16.2 | 53 | Base material | 1316 | INV. EX. |
| 21 | H | 30 | 1241 | 16.8 | 59 | Base material | 1297 | INV. EX. |
| 22 | H | 26 | 1285 | 13.5 | 26 | HAZ | 1322 | COMP. EX. |
| 23 | H | 29 | 1263 | 13.8 | 33 | Base material | 1325 | COMP. EX. |
| 24 | I | 15 | 554 | 18.0 | 58 | Base material | 611 | COMP. EX. |
| 25 | J | 35 | 1237 | 16.5 | 55 | Base material | 1293 | INV. EX. |
| 26 | J | 36 | 1230 | 17.4 | 51 | Base material | 1286 | INV. EX. |
| 27 | J | 38 | 1214 | 15.9 | 28 | HAZ | 1251 | COMP. EX. |
| 28 | J | 17 | 1296 | 13.4 | 59 | Base material | 1356 | COMP. EX. |
| 29 | K | 23 | 1222 | 15.1 | 48 | Base material | 1279 | INV. EX. |

TABLE 3-continued

| | | | | | | | | |
|---|---|---|---|---|---|---|---|---|
| 30 | K | 28 | 1215 | 16.2 | 43 | Base material | 1275 | INV. EX. |
| 31 | K | 16 | 1313 | 13.2 | 63 | Base material | 1373 | COMP. EX. |
| 32 | K | 38 | 1224 | 13.8 | 42 | Base material | 1288 | COMP. EX. |
| 33 | L | 36 | 1288 | 13.4 | 28 | HAZ | 1330 | COMP. EX. |
| 34 | M | 37 | 1293 | 13.1 | 28 | HAZ | 1340 | COMP. EX. |

*Underlines indicate being outside of the range of the present invention.
*10Bainitic ferrite having 20 or less internal carbides per 10 μm²
*11Retained austenite present adjacent to bainitic ferrite having 20 or less internal carbides per 10 μm²
*12Microstructure including one, or two or more of tempered martensite, fresh martensite, upper bainite, lower bainite, and retained austenite The steel sheets according to aspects of the present invention have superior ductility, excellent stretch flange formability, and excellent laser weldability and can be suitably applied to press forming and be suitably used in the press forming process in the manufacturing of, for example, automobiles and home appliances.

The steel sheets of INVENTIVE EXAMPLES have high strength, excellent ductility, excellent stretch flange formability, and excellent laser weldability. This has shown that members obtained by forming of the steel sheets of INVENTIVE EXAMPLES, members obtained by joining of the steel sheets of INVENTIVE EXAMPLES, and members obtained by forming and joining of the steel sheets of INVENTIVE EXAMPLES will have high strength, excellent ductility, excellent stretch flange formability, and excellent laser weldability similar to the steel sheets of INVENTIVE EXAMPLES.

The invention claimed is:

1. A steel sheet having a chemical composition comprising, in mass %:

C: 0.06 to 0.25%,
Si: 0.4 to 2.5%,
Mn: 1.5 to 3.5%,
P: 0.02% or less,
S: 0.01% or less,
sol. Al: less than 1.0%,
N: less than 0.015%,
and optionally,
one or two or more selected from the following groups A to C:
group A:
one or two selected from:
Ti: 0.1% or less, and
B: 0.01% or less,
group B:
one, or two or more selected from:
Cu: 1% or less,
Ni: 1% or less,
Cr: 1.0% or less,
Mo: 0.5% or less,
V: 0.5% or less,
Nb: 0.1% or less,
Zr: 0.2% or less, and
W: 0.2% or less,
group C:
one, or two or more selected from:
Ca: 0.0040% or less,
Ce: 0.0040% or less,
La: 0.0040% or less,
Mg: 0.0030% or less,
Sb: 0.1% or less, and
Sn: 0.1% or less,
the balance being Fe and incidental impurities,
the steel sheet being such that:
the steel sheet comprises a steel microstructure including, in area fraction,
polygonal ferrite: 10% or less,
tempered martensite: 40% or more,
fresh martensite: 20% or less,
bainitic ferrite having 20 or less internal carbides per 10 μm²: 3 to 40%, and, in volume fraction,
retained austenite: 5 to 20%, and
the steel sheet has a proportion $S_{C\geq0.5}/S_{C\geq0.3}\times100$ of 20% or more wherein $S_{C\geq0.5}$ is the area of a region having a C concentration, in mass %, of 0.50% or more and $S_{C\geq0.3}$ is the area of a region having a C concentration, in mass %, of 0.30% or more.

2. The steel sheet according to claim 1, wherein the steel microstructure has a number density of retained austenite present adjacent to the bainitic ferrite having 20 or less internal carbides per 10 μm² of 50 or more per 10000 μm².

3. The steel sheet according to claim 1, wherein the steel sheet has a total elongation of 16.0% or more when TS is less than 1180 MPa, 14.0% or more when TS is 1180 MPa or more and less than 1320 MPa, and 13.0% or more when TS is 1320 MPa or more.

4. The steel sheet according to claim 1, wherein the steel sheet has a hole expansion ratio of 30% or more.

5. The steel sheet according to claim 1, which has a galvanized layer on a surface.

6. The steel sheet according to claim 2, which has a galvanized layer on a surface.

* * * * *